(12) United States Patent
Wang et al.

(10) Patent No.: US 8,969,284 B2
(45) Date of Patent: *Mar. 3, 2015

(54) LAUNDRY DETERGENTS AND CLEANING COMPOSITIONS COMPRISING CARBOXYL GROUP-CONTAINING POLYMERS

(71) Applicant: The Procter & Gamble Company, Cincinnati, OH (US)

(72) Inventors: Xiaoli Wang, Beijing (CN); Brian Joseph Loughnane, Fairfield, OH (US); Xiaoyan Liu, Beijing (CN); Jeffrey Scott Dupont, Cincinatti, OH (US); Atsuro Yoneda, Osaka (JP); Daisuke Michitaka, Osaka (JP)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/967,384

(22) Filed: Aug. 15, 2013

(65) Prior Publication Data

US 2014/0066352 A1 Mar. 6, 2014

(30) Foreign Application Priority Data

Aug. 31, 2012 (CN) .......................... 2012 1 0080819

(51) Int. Cl.
| | |
|---|---|
| *C11D 3/386* | (2006.01) |
| *C11D 3/00* | (2006.01) |
| *C11D 3/37* | (2006.01) |
| *C11D 17/04* | (2006.01) |
| *C08F 220/06* | (2006.01) |
| *C08F 216/14* | (2006.01) |
| *C08F 220/38* | (2006.01) |

(52) U.S. Cl.
CPC ............. *C11D 3/0036* (2013.01); *C08F 216/14* (2013.01); *C11D 3/378* (2013.01); *C11D 17/049* (2013.01); *C08F 216/1466* (2013.01); *C08F 220/06* (2013.01); *C08F 220/38* (2013.01)
USPC ........... 510/475; 510/276; 510/302; 510/307; 510/320; 510/361; 510/434; 510/476

(58) Field of Classification Search
CPC .... C11D 3/3711; C11D 3/3757; C11D 3/378; C11D 3/386; C11D 3/3905
USPC ......... 510/276, 302, 307, 320, 361, 434, 475, 510/476
See application file for complete search history.

(56) References Cited

U.S. PATENT DOCUMENTS

| | | | |
|---|---|---|---|
| 8,586,523 B2 * | 11/2013 | Dupont et al. | 510/475 |
| 2011/0245132 A1 | 10/2011 | Dupont et al. | |
| 2012/0129751 A1 | 5/2012 | Miracle et al. | |
| 2012/0129753 A1 * | 5/2012 | Stenger et al. | 510/300 |

FOREIGN PATENT DOCUMENTS

WO WO 2010/024468 * 3/2010 ............... C11D 3/37

OTHER PUBLICATIONS

PCT International Search Report, dated Jun. 30, 2013, containing 12 pages.

* cited by examiner

*Primary Examiner* — Brian P Mruk
(74) *Attorney, Agent, or Firm* — John T. Dipre; Steven W. Miller

(57) ABSTRACT

The present invention relates to a laundry detergent or a cleaning composition, preferably a granular detergent product, comprising a carboxyl-group containing polymer, which is useful in improving whiteness and/or anti-soil redeposition. Processes for making and methods of using the laundry detergent or cleaning composition are also encompassed by the present invention.

19 Claims, 1 Drawing Sheet

Impact of Molecular Weight on Whiteness Maintenance

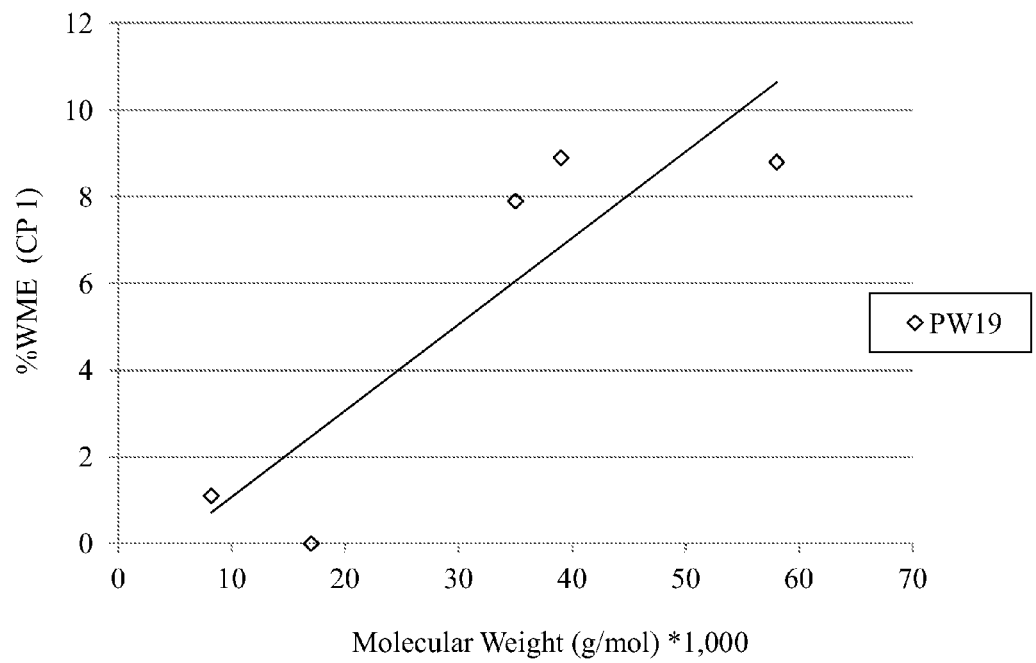

LAUNDRY DETERGENTS AND CLEANING COMPOSITIONS COMPRISING CARBOXYL GROUP-CONTAINING POLYMERS

FIELD OF THE INVENTION

The present invention is in the field of laundry detergents or cleaning compositions. In particular, it relates to a granular detergent product comprising carboxyl group-containing polymers comprising specific ratios of structural units derived from: (i) an ether bond-containing monomer, (ii) a sulfonic acid group-containing monomer, and (iii) an acrylic-based monomer; and having specific weight average molecular weight of from about 20,000 to about 60,000; for improved and/or enhanced cleaning performance, preferably whiteness maintenance and anti-soil redeposition. Processes for making and methods of using the laundry detergents and cleaning compositions are also encompassed by the present invention.

BACKGROUND OF THE INVENTION

Improved removal/reduction of soils and/or stains (e.g., organic stains), whiteness maintenance, and/or clay suspension are desirable properties for laundry detergents and cleaning compositions. Typically, the wash water used with laundry detergents or cleaning compositions, may contain naturally occurring contaminates (e.g., calcium, iron, barium, bicarbonate, carbonate, oxide, oxylate, sulfate, phosphate, zinc, etc.) that chemically combine in the wash to form insoluble precipitates. Additionally, the wash water may contain insoluble contaminates (e.g., clay, silica, iron oxides, etc.) that can settle out of water and deposit on the fabric article and/or various surfaces of the material being cleaned, during the wash. These precipitates and inert materials can collect on fabric and material surfaces to form residues and/or deposits, thereby negatively impacting its whiteness appearance, and hence overall cleaning performance.

Additionally, the current market demands are for laundry products and cleaning compositions with improved environmental sustainability (e.g., elimination of phosphate builders) and/or energy savings (e.g., formulated for re-used wash water, for example, re-used water in bathtub) without negatively impacting cleaning performance (e.g., whiteness maintenance, stain removal, anti-soil redeposition, etc.). This, of course, brings additional challenges since re-used wash water tends to have disadvantages, such as, increased soil components to fabric/materials in the re-used wash water, and elevated water hardness levels as a result of, for example, repeated heating.

Under high water hardness condition, anionic surfactants bind with the more readily available calcium and/or magnesium ions to reduce cleaning performance (i.e., reduce deposition inhibiting ability and stain removal). Flocculation of soil particles also tends to proceed readily in elevated water hardness conditions and leads to graying of the fabric/material from re-deposition of soils. In particular, the decrease in whiteness will become more dramatic over multi-cycle washes.

Further, there are practical challenges of providing sufficient cleaning performance for certain consumer wash behaviors, for example, dilute wash conditions due to insufficient amounts of laundry detergent or cleaning composition and/or excessive water volume have been used. Both cost constraints and loading capacity limitations mean that ever increasing levels of detergent ingredients or cleaning actives into the formulated laundry product or cleaning composition is not a viable option, but instead, further improvements are needed to meet these needs.

Typically, acrylate polymers have been useful as effective dispersants for suspension and removal of particulates. For example, Acusol 445™ (Rohm and Haas), a homopolymer of acrylic acid having a molecular weight of 4,500 g/mol, delivers cleaning benefits by adsorbing to the charged soil surface, through its acrylate functionality, for removal of the soil from the wash water. However, Acusol 445™'s low molecular weight is insufficient to impart any significant steric stabilization of primary soil particles in the wash water to prevent aggregation of the soil particles.

One way to improve acrylate functionality is through modification with non-ionic monomers to ensure sufficient steric stabilization, while sulfonation is another way to impart more electrostatic stabilization once the polymers absorbs onto the soil surface. PCT Publications WO2010/024448, Yoneda, A., et al., and WO2010/04468, Dupont, J. S., et al., describe carboxyl group-containing polymers as hydrophobic group-containing copolymers comprising certain molar ratios of: (i) an ether bond-containing monomer, (ii) a carboxylic group-containing monomer, and (iii) a sulfonic acid group-containing monomer; and having an average molecular weight range of 2,000-200,000, to reduce/prevent surfactant precipitation. However, neither application discloses any preferred molecular weight ranges for the polymers useful for improved soil and stain removal, whiteness maintenance, and/or clay suspension, preferably when formulated in products for use in dilute and high water hardness wash conditions.

Therefore, not all conventional carboxyl group-containing polymers and compositions containing these polymers meet the recent need, that is, high performance in aqueous environment enough. Therefore, further improvements are required to provide laundry detergents and cleaning compositions comprising polymers suitable to meet the challenge of environmental sustainability and/or energy efficiency.

Accordingly, there is a need for a laundry detergent or cleaning composition having superior cleaning performance than what has existed before. In particular, the laundry detergent or cleaning composition having improved anti-soil redeposition and/or whiteness maintenance, sufficient to prevent soil particles and/or aggregates from reattaching to fabric/material surfaces being washed, preferably hard water wash conditions and/or over multi-cycle washes.

The need also exists for a laundry detergent or cleaning composition having improved soil or stain removal benefit, preferably effective on organic stains.

It is also desirable that the laundry detergent or cleaning composition has sufficient cleaning performance across a range of consumer wash habits, for example, dilute wash conditions and/or use of recycled wash water.

SUMMARY OF THE INVENTION

In a first aspect, the present invention is directed to a laundry detergent or cleaning composition comprising a carboxyl group-containing polymer which exhibit improved anti-soil redeposition ability when formulated in a product, preferably a laundry detergent product for fabric washing. The inventors identified a carboxyl group-containing polymer which comprises specific ratios of a structure unit derived from: (i) an ether bond-containing monomer (A), (ii) a structure unit derived from a sulfonic acid group-containing monomer (B), and a structure unit derived from an acrylic acid-based monomer (C); and having a specific weight average molecular weight of from about 20,000 to about 60,000; such that when formulated in the laundry detergent or cleaning composition improves its' cleaning performance for example, whiteness maintenance, soil and stain removal, and clay suspension.

In an embodiment, the laundry detergent or cleaning composition further comprises an adduct of a hydrogen sulfite to the acrylic acid-based monomer (C), which is suitable as a control for adjusting the molecular weight of the polymer to the desired level for improving cleaning performance.

In yet another aspect, the process for making laundry detergent or the cleaning compositions comprising the carboxyl group-containing polymer efficiently is disclosed. These and other features of the present invention will become apparent to one skilled in the art upon review of the following detailed description when taken in conjunction with the appended claims.

BRIEF DESCRIPTION OF THE DRAWINGS

While the specification concludes with claims particularly pointing out and distinctly claiming the invention, it is believed that the invention will be better understood from the following description of the accompanying figures wherein:

FIG. 1 shows the impact of weight average molecular weight on whiteness maintenance from Example 4.

DETAILED DESCRIPTION OF THE INVENTION

As used herein, the articles "a" and "an" when used in a claim, are understood to mean one or more of what is claimed or described.

As used herein, the term "cleaning composition" means a liquid or solid composition, and especially includes: hard surface cleaning composition; hand dishwashing agents or light duty dishwashing agents, especially those of the high-foaming type; machine dishwashing agents; personal care compositions; pet care compositions; automotive care compositions; and household care compositions. In one embodiment, the cleaning composition of the present invention is a hard surface cleaning composition, preferably wherein the hard surface cleaning composition impregnates a nonwoven substrate.

As used herein, the term "laundry detergent" means a liquid or solid composition, and includes, unless otherwise indicated, granular or powder-form all-purpose or "heavy-duty" washing agents, especially cleaning detergents as well as cleaning auxiliaries such as bleach additives or pre-treat types. In one embodiment, the laundry detergent is a solid laundry detergent composition, and preferably a free-flowing particulate laundry detergent composition (i.e., a granular detergent product).

As used herein, the terms "water hardness" or "hardness-tolerant" means uncomplexed calcium (i.e., $Ca^{2+}$) arising from water and/or soils on dirty fabrics/materials; more generally and typically, "water hardness" also includes other uncomplexed cations (e.g., $Mg^{2+}$) having the potential to precipitate under alkaline conditions, and tends to diminish the surfactancy and cleaning capacity of surfactants. Further, the terms "high water hardness" or "elevated water hardness" can be used interchangeably and are relative terms for the purposes of the present invention, and are intended to mean at least "12 grams per gallon water (gpg, "American grain hardness" units) of calcium ion".

As used herein, the term "average molecular weight" refers to the average molecular weight of the polymer chains in a polymer composition. Further, the "weight average molecular weight" ("$M_w$") may be calculated using the equation:

$$M_w = (\Sigma_i N_i M_i^2)/(\Sigma_i N_i M_i)$$

Where $N_i$ is the number of molecules having a molecular weight $M_i$. The weight average molecular weight must be measured by the method described in the Test Methods section.

As used herein, the term "whiteness maintenance" means the ability of the carboxyl group-containing polymers or laundry detergent or cleaning composition comprising the polymers of the present invention to prevent or reduce the whiteness loss on clean fabrics/material surfaces associated with washing.

As used herein, the term "anti-soil redeposition" means the ability of the polymer to prevent soil components from reattaching to fibers or materials in washing treatment using water. In the context of high hardness water conditions, the anti-soil redeposition ability, preferably, needs to be better than existing polyacrylate polymers, having lower molecular weight ranges, to achieve improved cleaning performance, for example, enhanced whiteness maintenance, must be measured by the method described in the Test Methods section.

As used herein, the term "organic stains" means stains derived from clay, proteinaceous and oxidizable soils, preferably in the presence of transition metal impurities.

It is understood that the assays disclosed in the Test Methods section of the present application must be used to determine the respective values of the parameters of the present invention, as such an invention is described and claimed herein.

Specifically, the present invention provides a laundry detergent or cleaning composition comprising a carboxyl group-containing polymer including: a structure unit (a) derived from an ether bond-containing monomer (A) represented by the formula (1) shown below; a structure unit (b) derived from a sulfonic acid group-containing monomer (B); and a structure unit (c) derived from an acrylic acid-based monomer (C). The structure unit (a) is present at a level of from about 0.5% to about 10% by mass based on 100% by mass of all structure units derived from all monomers in the carboxyl group-containing polymer; the structure unit (b) is present at a level of from about 0.5% to about 30% by mass based on 100% by mass of all the structure units derived from all the monomers in the carboxyl group-containing polymer; and the structure unit (c) is present at a level of from about 55% to about 99% by mass based on 100% by mass of all the structure units derived from all the monomers in the carboxyl group-containing polymer. The carboxyl group-containing polymer has a weight average molecular weight of from about 20,000 to about 60,000.

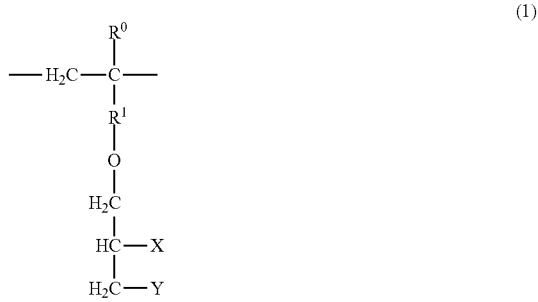

In the formula (1), $R^0$ represents a hydrogen atom or a methyl group; $R^1$ represents a $CH_2$ group, a $CH_2CH_2$ group, or a direct bond; X represents a hydroxyl group or a group represented by the following formula (2) or (3):

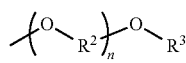

(2)

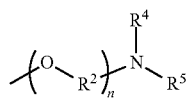

(3)

wherein $R^2$s, which may be the same or different, represent a $C_2$-$C_4$ alkylene group; n represents an average addition number of moles of an oxyalkylene group ($-O-R^2-$) and is 0 to 5; and $R^3$, $R^4$ and $R^5$ independently represent a $C_1$-$C_4$ alkyl group;

Y represents a hydroxyl group or a group represented by the formula (2) or (3); and one of X and Y is a hydroxyl group and the other is a group represented by the formula (2) or (3).

The present invention also provides a laundry detergent or cleaning composition comprising the carboxyl group-containing polymer composition, as described herein above, and an adduct of a hydrogen sulfite to the acrylic acid-based monomer (C). The adduct is present at a level of from about 0.01% to about 1.5% by mass based on 100% by mass of the solids content of the carboxyl group-containing polymer composition.

Carboxyl Group-Containing Polymer

The carboxyl group-containing polymer (hereinafter, can also be referred to as the "polymer") includes a structure unit (a) at a level of from about 0.5% to about 15% by mass, a structure unit (b) at a level of from about 0.5% to about 30% by mass, and a structure unit (c) at a level of from about 55% to about 99% by mass based on 100% by mass of all structure units derived from all monomers in the carboxyl group-containing polymer (hereinafter, also referred to as "all the structure units"). The structure unit (a) is derived from an ether bond-containing monomer (A), the structure unit (b) is derived from a sulfonic acid group-containing monomer (B), and the structure unit (c) is derived from an acrylic acid-based monomer (C). The weight average molecular weight of the carboxyl group-containing polymer is 20,000 to 60,000.

Ether Bond-Containing Monomer (A)

The carboxyl group-containing polymer of the present invention is a polymer essentially including a structure unit (a) derived from an ether bond-containing monomer (A) (hereinafter, also referred to as "monomer (A)").

The structure unit (a) derived from an ether bond-containing monomer (A) is represented by the formula (1), and corresponds to a structure unit derived from a later-described ether bond-containing monomer (A) represented by the formula (4) in which the carbon-carbon double bond is converted to a single bond.

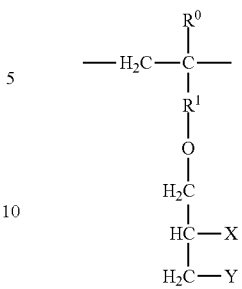

(1)

In the formula (1), $R^0$ represents a hydrogen atom or a methyl group; $R^1$ represents a $CH_2$ group, a $CH_2CH_2$ group, or a direct bond; X represents a hydroxyl group or a group represented by formula (2) or (3); Y represents a hydroxyl group or a group represented by the formula (2) or (3); and one of X and Y is a hydroxyl group and the other is a group represented by the formula (2) or (3).

In the formulas (2) and (3), $R^2$s, which may be the same or different, represent a $C_2$-$C_4$ alkylene group; n represents an average addition number of moles of an oxyalkylene group ($-O-R^2-$) and is 0 to 5; and $R^3$, $R^4$ and $R^5$ independently represent a $C_1$-$C_4$ alkyl group.

Due to the presence of the hydrophobic group represented by the formula (2) or (3), the structure unit (a) has adsorbability to soils attached on fibers and the like. Additionally, due to the presence of the structure unit (a), the carboxyl group-containing polymer has adsorbability to hydrophobic soils and exhibit notable anti-soil redeposition ability against hydrophobic soils.

Examples of the ether bond-containing monomer (A) include monomers represented by the formula (4).

$$H_2C=\underset{\underset{\underset{\underset{\underset{H_2C-Y}{HC-X}}{H_2C}}{O}}{R^1}}{\overset{R^0}{C}}$$ (4)

In the formula (4), $R^0$, $R^1$, X, and Y are all defined as above for the formula (1). When $R^1$ in the formula (4) represents a direct bond, $H_2C=C(R^0)-R^1-O-$ in the formula (4) is $H_2C=C(R^0)-O-$. The same applies to the formula (1).)

$H_2C=C(R^0)-R^1-$ is a methallyl group when $R^0$ and $R^1$ are a methyl group and a $CH_2$ group, respectively. $H_2C=C(R^0)-R^1-$ is an isoprenyl group when $R^0$ and $R^1$ are a methyl group and a $CH_2CH_2$ group, respectively. $H_2C=C(R^0)-R^1-$ is an isopropenyl group when $R^0$ and $R^1$ are a methyl group and a direct bond, respectively. $H_2C=C(R^0)-R^1-$ is an allyl group when $R^0$ and $R^1$ are a hydrogen atom and a $CH_2$ group, respectively. $H_2C=C(R^0)-R^1-$ is a butenyl group when $R^0$ and $R^1$ are a hydrogen atom and a $CH_2CH_2$ group, respectively. $H_2C=C(R^0)-R^1-$ is a vinyl group when $R^0$ and $R^1$ are a hydrogen atom and a direct bond, respectively.)

$H_2C=C(R^0)-R^1-$ is preferably an isoprenyl group, a methallyl group, an allyl group, or a vinyl group. In terms of improvement in polymerizability, $H_2C=C(R^0)-R^1-$ is more preferably an isoprenyl group, a methallyl group, or an allyl group, and still more preferably an isoprenyl group or a methallyl group.

X and Y in the formulas (1) and (4) independently represent a hydroxyl group or a group represented by the formula (2) or (3). One of X and Y is a hydroxyl group, and the other is a group represented by the formula (2) or (3).

$R^2$s in the formulas (2) and (3) may be the same or different and represent a C2-C4 alkylene group. Examples of $C_2$-$C_4$ alkylene groups include ethylene, propylene, and butylene groups. In terms of improvement in polymerizability of the ether bond-containing monomer (A), $C_2$-$C_3$ alkylene groups such as ethylene and propylene groups are preferable. One or more of the alkylene groups may be included.

The number n in the formulas (2) and (3) represents an average addition number of moles of the oxyalkylene group ($-O-R^2-$) and is 0 to 5. In terms of detergency and/or cleaning performance against muddy soils, n is preferably 0 to 4, more preferably 0 to 3, still more preferably 0 to 2, particularly preferably 0 or 1, and most preferably 0.

$R^3$, $R^4$, and $R^5$ in the formulas (2) and (3) independently represent a $C_1$-$C_4$ alkyl group. Examples of $C_1$-$C_4$ alkyl groups include methyl, ethyl, n-propyl, isopropyl, n-butyl, isobutyl, and t-butyl groups. These $C_1$-$C_4$ alkyl groups may have a substituent(s). Examples of substituents include amino and hydroxyl groups. Particularly, methyl, ethyl, and butyl groups are preferable and butyl group is more preferable in terms of improvement in anti-soil redeposition ability and whiteness maintenance of the polymer.

$R^4$ and $R^5$ in the formula (3) may be linked to each other, thereby forming a ring. In this case, in order to stabilize the ring structure, the ring structure formed by the nitrogen atom, $R^4$ and $R^5$ is preferably a 3- to 7-membered ring, that is, the total number of carbon atoms of $R^4$ and $R^5$ is preferably 2 to 6.

Examples of the combination of X and Y (written in this order) include a hydroxyl group and a group represented by the formula (2); a hydroxyl group and a group represented by the formula (3); a group represented by the formula (2) and a hydroxyl group; and a group represented by the formula (3) and a hydroxyl group. In terms of improvement in the anti-soil redeposition ability of the polymer, X and Y are preferably a hydroxyl group and a group represented by the formula (2), respectively, or a hydroxyl group and a group represented by the formula (3), respectively, and more preferably a hydroxyl group and a group represented by the formula (2), respectively.

As used herein, the phrase "carboxyl group-containing polymer comprising a structure unit (a) derived from an ether bond-containing monomer (A)" means that the prepared polymer contains a structure unit represented by the formula (1). Specifically, the "structure unit (a) derived from an ether bond-containing monomer (A)" herein is intended to include structure units introduced in a step before a polymerization reaction and structure units introduced in a step after a polymerization reaction, and refers to, for example, a structure unit that is incorporated in the polymer by synthesizing the ether bond-containing monomer (A), and then copolymerizing the ether bond-containing monomer (A) with another monomer, or a structure unit that is completed by forming the main chain of the carboxyl group-containing polymer by copolymerization, and then introducing a side chain of a specific structure thereto.

The carboxyl group-containing polymer of the present invention may include only one structure unit (a) or may include two or more structure units (a).

The structure unit (a) is contained at a level of from about 0.5% to about 10% by mass based on 100% by mass of all the structure units derived from all the monomers in the carboxyl group-containing polymer (i.e., the total amount of the structure unit (a), and structure units (b), (c) and (e) as described below). The polymer of the present invention which includes the structure unit (a) at a level within this range is capable of successfully interacting with soil components when used as a detergent builder and the like. Therefore, the polymer can disperse soil particles by the interaction and exhibit improved anti-soil redeposition ability and whiteness maintenance, preferably for multi-cycle washes. Additionally, the polymer can have improved compatibility with surfactants.

The level of the structure unit (a) is preferably from about 1% to about 9% by mass, more preferably from about 2% to about 8% by mass, and still more preferably from about 3% to about 7% by mass.

The method for preparing the ether-bond containing monomer (A) is not particularly limited, and any suitable method can be used for the preparation. A preparation method for reacting the epoxy ring of a compound having a carbon-carbon double bond and an epoxy ring with the hydroxyl group and/or the amino group of a compound having a $C_1$-$C_4$ alkyl group and a hydroxyl group and/or an amino group is mentioned as an example of a simple method for the preparation. Examples of the compound having a carbon-carbon double bond and an epoxy ring include (meth)allyl glycidyl ether and glycidyl vinyl ether. Examples of the compound having a $C_1$-$C_4$ alkyl group and a hydroxyl group and/or an amino group include methanol, ethanol, isopropanol, n-butanol, di-n-isopropylamine, and di-n-butylamine. The reaction may be carried out in the absence of catalysts or may be carried out in the presence of an acidic catalyst such as trifluoroboron or a basic catalyst such as sodium hydroxide or potassium hydroxide.

Sulfonic Acid Group-Containing Monomer (B)

The carboxyl group-containing polymer of the present invention is a polymer essentially including a structure unit (b) derived from a sulfonic acid group-containing monomer (B) (hereinafter, also referred to as "monomer (B)") as well.

Examples of the sulfonic acid group-containing monomer (B) include compounds having a carbon-carbon double bond and a sulfonic acid (salt) group. Specific examples thereof include vinylsulfonic acid, styrenesulfonic acid, (meth)allylsulfonic acid, 3-(meth)allyloxy-2-hydroxypropanesulfonic acid, 3-(meth)allyloxy-1-hydroxypropanesulfonic acid, 2-(meth)allyloxyethylenesulfonic acid, 2-acrylamide-2-methylpropanesulfonic acid, and salts of these. In order to more successfully ensure the effect of the present invention enough, 3-(meth)allyloxy-2-hydroxypropanesulfonic acid and salts thereof are preferable, and 3-allyloxy-2-hydroxypropanesulfonic acid and the sodium salt thereof are more preferable.

Examples of the structure unit (b) include a structure derived from a monomer (B) in which the carbon-carbon double bond is converted to a single bond (at least one carbon-carbon double bond is converted to a single bond if two or more double bonds are present). Preferred examples of the monomer (B) include those represented by the following formula (5), and preferred examples of the structure unit (b) include those represented by the following formula (6).

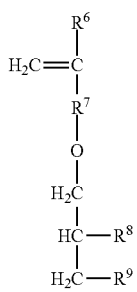

(5)

In the formula, $R^6$ represents a hydrogen atom or a methyl group; $R^7$ represents a $CH_2$ group, a $CH_2CH_2$ group, or a direct bond; $R^8$ and $R^9$ independently represent a hydroxyl group or $-SO_3Z$; Z represents a hydrogen atom, a metal atom, an ammonium group, or an organic amine group; and at least one of $R^8$ and $R^9$ is $-SO_3Z$.

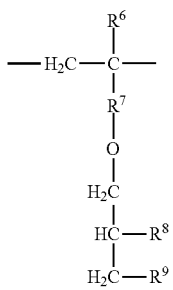

(6)

In the formula, $R^6$, $R^7$, $R^8$, and $R^9$ are defined as above. Due to the presence of the structure unit (b), the carboxyl group-containing polymer can act as a high-performance dispersant for tough soils, and exhibit enhanced anti-soil redeposition ability against hydrophobic soils and improved whiteness maintenance.

$R^6$ in the formulas (3) and (4) represents a hydrogen atom or a methyl group, and is preferably a hydrogen atom.

$R^7$ represents a $CH_2$ group, a $CH_2CH_2$ group, or a direct bond, and is preferably a $CH_2$ group.

$R^8$ and $R^9$ independently represent a hydroxyl group or $-SO_3Z$, and at least one of $R^8$ and $R^9$ is $-SO_3Z$. In a preferred embodiment, only one of $R^4$ and $R^5$ is $-SO_3Z$.

Z represents a hydrogen atom, a metal atom, an ammonium group, or an organic amine group.

In the case that Z is a metal atom, an ammonium group, or an organic amine group, $-SO_3Z$ is a metal salt, an ammonium salt, or an organic amine salt of sulfonic acid.

Examples of metal atoms and organic amines for Z include the same metal atoms and organic amines listed below for $R^{10}$ described below. Z is preferably a hydrogen atom, an alkali metal atom, or an ammonium group, more preferably a hydrogen atom, sodium, or potassium, and still more preferably a hydrogen atom or sodium.

As used herein, the phrase "carboxyl group-containing polymer comprising a structure unit (b) derived from a sulfonic acid group-containing monomer (B)" means that the prepared polymer contains a structure unit represented by the formula (6). Specifically, the "structure unit (b) derived from a sulfonic acid group-containing monomer (B)" herein is intended to include structure units introduced in a step before a polymerization reaction and structure units introduced in a step after a polymerization reaction, and refers to, for example, a structure unit that is incorporated in the polymer by synthesizing the sulfonic acid group-containing monomer (B), and then copolymerizing the sulfonic acid group-containing monomer (B) with another monomer, or a structure unit that is completed by forming the main chain of the carboxyl group-containing polymer by copolymerization, and then introducing a side chain of a specific structure thereto.

The carboxyl group-containing polymer of the present invention may include only one structure unit (b) or two or more structure units (b).

The structure unit (b) is contained at a level of from about 0.5% to about 25% by mass based on 100% by mass of all the structure units derived from all the monomers in the carboxyl group-containing polymer (i.e., the total amount of the structure units (a) and (b) and structure units (c) and (e) described below). The polymer of the present invention which includes the structure unit (b) at a level within this range is capable of successfully interacting with soil components when used as a detergent builder and the like. Therefore, the polymer can disperse soil particles by the interaction and exhibit enhanced anti-soil redeposition ability and whiteness maintenance, preferably for multi-cycle washes.

The level of the structure unit (b) is preferably from about 1% to about 23% by mass, more preferably from about 3% to about 22% by mass, and still more preferably from about 5% to about 21% by mass.

In the present invention, when the mass ratio (% by mass) of the structure unit (b) to all the structure units derived from all the monomers in the carboxyl group-containing polymer is calculated, the structure unit (b) is treated as its corresponding acid. In the case of a structure unit derived from sodium 3-allyloxy-2-hydroxypropanesulfonate, the mass ratio (% by mass) of the structure unit derived from the corresponding acid (3-allyloxy-2-hydroxypropanesulfonic acid) is calculated. Likewise, when the mass ratio (% by mass) of the sulfonic acid group-containing monomer (B) to all the monomers is calculated, the sulfonic acid group-containing monomer (B) is treated as its corresponding acid. For example, to determine the mass ratio of sodium 3-allyloxy-2-hydroxypropanesulfonate, the mass ratio (% by mass) of the corresponding (3-allyloxy-2-hydroxypropanesulfonic acid) is calculated instead.

The method for preparing the sulfonic acid group-containing monomer (B) is not particularly limited, and any suitable method can be used for the preparation. For example, a method for adding a hydrogen sulfite to the glycidyl group of (meth)allylglycidyl ether is mentioned as an example of a simple method for the preparation.

Acrylic Acid-Based Monomer (C)

The carboxyl group-containing polymer herein is a polymer essentially including the structure unit (c) derived from an acrylic acid-based monomer (C) (hereinafter, also simply referred to as "monomer (C)") as well.

Examples of the acrylic acid-based monomer (C) herein include monomers represented by the formula (7):

(7)

wherein $R^{10}$ represents a hydrogen atom, a metal atom, an ammonium group, or an organic amine group.

Examples of the structure unit (c) derived from an acrylic acid-based monomer (C) include a structure derived from a monomer (C) in which the carbon-carbon double bond is converted to a single bond. Specific examples thereof are those represented by the formula (8):

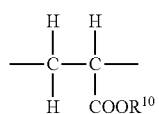

(8)

wherein $R^{10}$ is defined as above. Due to the presence of the structure unit (c), the carboxyl group-containing polymer can act as a high-performance dispersant and exhibit enhanced anti-soil redeposition ability against hydrophobic soils and whiteness maintenance, preferably for multi-cycle washes.

When $R^{10}$ in the formulas (7) and (8) is a metal atom, an ammonium group, or an organic amine group, the acrylic acid-based monomer (C) is a metal salt, an ammonium salt, or an organic amine salt of acrylic acid.

Examples of metal atoms for $R^{10}$ in the formulas (7) and (8) include alkali metal atoms such as lithium, sodium, and potassium; and alkaline earth metal atoms such as magnesium and calcium; and aluminum and iron.

Examples of organic amines for $R^{10}$ include alkanolamines such as monoethanolamine, diethanolamine, and triethanolamine; alkylamines such as monoethylamine, diethylamine, and triethylamine; and polyamines such as ethylenediamine and triethylenediamine.

$R^{10}$ is preferably a hydrogen atom, an alkali metal, or an ammonium group because they have a greater effect of improving the anti-soil redeposition ability of the polymer. $R^{10}$ is more preferably a hydrogen atom, sodium, potassium, or an ammonium group, and still more preferably a hydrogen atom or sodium.

Specific examples of the acrylic acid-based monomer (C) include acrylic acid and salts thereof. The acrylic acid-based monomer (C) is preferably acrylic acid or the sodium salt thereof.

The phrase "carboxyl group-containing polymer comprising a structure unit (c) derived from an acrylic acid-based monomer (C)" means that the prepared polymer contains a structure unit represented by the formula (8). Specifically, the "structure unit (c) derived from an acrylic acid-based monomer (C)" herein is intended to include structure units introduced in a step before a polymerization reaction and structure units introduced in a step after a polymerization reaction, and refers to, for example, a structure unit that is incorporated in the polymer by synthesizing the acrylic acid-based monomer (C), and then copolymerizing the acrylic acid-based monomer (C) with another monomer, or a structure unit that is completed by forming the main chain of the carboxyl group-containing polymer by copolymerization, and then introducing a side chain of a specific structure thereto.

The carboxyl group-containing polymer of the present invention may include only one structure unit (c) or may include two or more structure units (c).

The structure unit (c) is contained at a level of from about 55% to about 99% by mass based on 100% by mass of all the structure units derived from all the monomers in the carboxyl group-containing polymer (i.e. the total amount of the structure units (a), (b) and (c) and structure unit(s) (e) described below). The polymer of the present invention which includes the structure unit (c) at a level within this range is capable of successfully interacting with soil components when used as a detergent builder and the like. Therefore, the polymer can disperse soil particles by the interaction and exhibit improved anti-soil redeposition ability and whiteness maintenance, preferably for multi-cycle washes.

The level of the structure unit (c) is preferably from about 68% to about 98% by mass, more preferably from about 70% to about 95% by mass, and still more preferably from about 72% to about 92% by mass.

In the present invention, when the mass ratio (% by mass) of the structure unit (c) to all the structure units derived from all the monomers in the carboxyl group-containing polymer is calculated, the structure unit (c) is treated as its corresponding acid. In the case of the structure unit —$CH_2$—CH (COONa)— derived from sodium acrylate, the mass ratio (% by mass) of the structure unit derived from the corresponding acid (acrylic acid), that is, the mass ratio (% by mass) of the structure unit —$CH_2$—CH(COOH)— is calculated. Likewise, when the mass ratio (% by mass) of the acrylic acid-based monomer (C) to all the monomers is calculated, the acrylic acid-based monomer (C) is treated as its corresponding acid. For example, to determine the mass ratio of sodium acrylate, the mass ratio (% by mass) of the corresponding acid (acrylic acid) is calculated instead.

The method for preparing the acrylic acid-based monomer (C) is not particularly limited.

Other Monomers

The carboxyl group-containing polymer of the present invention may include structure unit(s) (e) derived from other monomer(s) (E) (monomer(s) other than the ether bond-containing monomer (A), the sulfonic acid group-containing monomer (B), and the acrylic acid-based monomer (C)). The carboxyl group-containing polymer may contain only one structure unit (e) or two or more structure units (e).

The other monomer(s) (E) (hereinafter, also referred to as monomer(s) (E)) are not particularly limited, provided that they are copolymerizable with the monomers (A), (B), and (C). Appropriate ones can be selected by considering desired effects.

Specific examples of other monomers (E) include carboxyl group-containing monomers other than the monomer (C) such as methacrylic acid, maleic acid, crotonic acid, itaconic acid, 2-methyleneglutaric acid, and salts of these; polyalkylene glycol chain-containing monomers such as monomers obtained by adding alkylene oxides to unsaturated alcohols (e.g., (meth)allylalcohol, isoprenol) and (meth)acrylic acid esters of alkoxyalkylene glycols; vinyl aromatic compound-based monomers having a heterocyclic aromatic hydrocarbon group such as vinyl pyridine and vinyl imidazole; amino group-containing monomers such as dialkylaminoalkyl (meth)acrylates (e.g., dimethylaminoethyl acrylate, dimethylaminoethyl methacrylate, dimethylaminopropyl acrylate), dialkylaminoalkyl(meth)acrylamides (e.g., dimethylaminoethyl acrylamide, dimethylaminoethyl methacrylamide, dimethylaminopropyl acrylamide), allylamines including diallylamine and diallylalkylamines (e.g., diallyldimethylamine), and quaternized compounds of these; N-vinyl monomers such as N-vinyl pyrrolidone, N-vinylformamide, N-vinylacetamide, N-vinyl-N-methylformamide, N-vinyl-N-methylacetamide, and N-vinyloxazolidone; amide-based monomers such as (meth)acrylamide, N,N-dimethylacrylamide, and N-isopropylacrylamide; hydroxyl group-containing monomers such as (meth)allylalcohol and isoprenol; alkyl (meth)acrylate-based monomers such as butyl(meth)acrylate, 2-ethylhexyl(meth)acrylate, and dodecyl(meth)acrylate; hydroxyalkyl(meth)acrylate-based monomers such as 2-hydroxyethyl(meth)acrylate, 2-hydroxypropyl(meth)acrylate, 2-hydroxybutyl(meth)acrylate, 4-hydroxybutyl(meth)acrylate, and 2-hydroxyhexyl(meth)acrylate; vinylaryl monomers such as styrene, indene, and vinylaniline; and isobutylene and vinyl acetate.

The quaternized compounds can be obtained by the reaction between the amino group-containing monomers and common quaternizing agents. Examples of the quaternizing agents include alkyl halides and dialkyl sulfates.

The structure units (e) derived from other monomers (E) refer to structure units derived from the monomers (E) in each of which the carbon-carbon double bond is converted to a single bond (at least one carbon-carbon double bond is converted to a single bond if two or more double bonds are present).

As used herein, the phrase "carboxyl group-containing polymer comprising structure unit(s) (e) derived from other monomer(s) (E)" means that the prepared polymer contains structure unit(s) in which the unsaturated double bond in the monomer(s) (E) is converted to a single bond.

The level of the structure unit(s) (e) derived from other monomer(s) (E), which are optional components, is preferably from about 0% to about 34% by mass based on 100% by mass of all the structure units derived from all the monomers in the carboxyl group-containing polymer (i.e., the total amount of the structure units (a), (b), (c), and (e)). The level is more preferably from about 0% to 10% by mass, still more preferably from about 0% to about 5% by mass, and particularly preferably 0% by mass.

In the case that the structure unit (e) is a structure unit derived from an amino group-containing monomer, the mass ratio of this structure unit to all the structure units derived from all the monomers and the mass ratio of the amino group-containing monomer to all the monomers are calculated by treating the structure unit and the monomer as the corresponding unneutralized amine. For example, in the case that the other monomer (E) is vinylamine hydrochloride, the mass ratio (% by mass) of its corresponding unneutralized amine, that is, the mass ratio of vinylamine is calculated instead.

The mass ratios (% by mass) of quaternized amino group-containing monomers and structure units derived from these are calculated without counting the mass of counteranions.

In the case that the structure unit (e) is a structure unit derived from an acid group-containing monomer, the mass ratio (% by mass) of the structure unit to all the structure units derived from all the monomers is calculated by treating the structure unit as its corresponding acid. The mass ratio (% by mass) of the acid group-containing monomer to all the monomers is also calculated by treating the monomer as its corresponding acid.

Physical Properties of Carboxyl Group-Containing Polymer

The laundry detergent or cleaning composition of the present invention comprising a carboxyl group-containing polymer, wherein the polymer comprises the structure units (a), (b), and (c) at specific levels defined above, and optionally, contains the structure unit(s) (e) at a specific level defined above. These structure units may be arranged in either a block or random fashion.

Molecular weight is one of the most important factors that controls both the confirmation and adsorption behavior of polymers onto particular soil surfaces. Typically, increasing molecular weight, especially above 60,000, would tend to increase the deposition of the polymer/soil complex and/or polymer/$Ca^{2+}$ precipitate on fabric/material surface leading to residue issues. With too high number-weight average molecular weight, the carboxyl group-containing polymer will have high viscosity and therefore will be difficult to handle. Conversely, with too low number-weight average molecular weight, the anti-soil redeposition ability may not be provided, especially for elevated hardness water wash conditions.

In this case, the inventors learned unexpectedly that increasing the molecular weight of the carboxyl group-containing polymer, within certain ranges, did not negatively impact the residue deposition profile of the polymers. Further, the inventors discovered that the increased molecular weight of the carboxyl-group containing polymers lead to improved soil dispersion and when formulated into laundry detergents or cleaning composition delivered enhanced whiteness maintenance as compared to similar polyacrylate polymers having lower molecular weight ranges.

Without wishing to be bound by theory, it is expected that low molecular weight highly water soluble carboxyl-group containing polymers have a low interaction energy at the soil-polymer surface interface and poor adsorption compared to high molecular weight highly water soluble carboxyl-group containing polymers. Furthermore, high molecular weight carboxyl group-containing polymers that effectively adsorb and anchors on to the soil surface, electrostatically and sterically stabilizes the soil/detergent residue. Once the soil is stabilized in the wash solution re-deposition on clean fabric is prevented.

While the carboxyl group-containing polymer has the weight average molecular weight range of from about 20,000 to about 60,000, within that range it is not particularly limited, and suitable molecular weights can be appropriately determined, considered desired cleaning performance, such as, for example, improved anti-soil redeposition, clay suspension, whiteness maintenance and/or stain removal, for the laundry detergent or cleaning composition of the present invention.

If the weight average molecular weight is in this range, the anti-soil redeposition ability is improved and the whiteness maintenance is enhanced when the polymer is formulated in the laundry detergent or cleaning composition. The weight average molecular weight is preferably from about 30,000 to about 50,000, more preferably from about 33,000 to about 42,000, even more preferably from about 35,000 to about 40,000, and most preferably from about 36,000 to about 39,000.

Additionally, the inventors have found that carboxyl group-containing polymers having too high weight average molecular weight (i.e., >60,000) tended to have too high viscosity and therefore will be difficult to handle across a range of manufacturing conditions. With too low weight average molecular weight (i.e., <19,000), however, the inventors found that the laundry detergent or cleaning compositions comprising those carboxyl group-containing polymers did not provide sufficient, preferably, enhanced/improved, anti-soil redeposition and whiteness maintenance benefits.

The weight average molecular weight of the carboxyl group-containing polymer herein was determined by the method and conditions as described in the assay from the Test Methods section.

The carboxyl group-containing polymer and the laundry detergent or cleaning composition comprising the polymer of the present invention have improved anti-soil redeposition ability, and preferably have an anti-soil redeposition ratio of from about 37.0% to about 46.0%, preferably from about 37.5% to about 45.0%, and more preferably from about 37.5% to about 39.0%. The anti-soil redeposition ratio can be measured by the procedure described in the Anti-Soil Redeposition Ability Test as described herein.

Further, the carboxyl group-containing polymer and the laundry detergent or cleaning composition comprising the polymer of the present invention have improved whiteness maintenance performance, as demonstrated by a whiteness index measurement of from 2.0 or greater, preferably from 3.0 or greater, more preferably 4.0 or greater, and even more preferably 5.0 or greater, according to the Whiteness Maintenance Assay as described herein.

Alternatively, the carboxyl group-containing polymer and the laundry detergent or cleaning composition comprising the polymer of the present invention have at least 6% Whiteness Maintenance Effect (WME), preferably at least 8% WME, more preferably at least 10% WME, even more preferably 12% WME, and most preferably at least 20% WME, whereby the % WME is defined as described herein.

Given the enhanced anti-soil redeposition ability, the carboxyl group-containing polymer and the laundry detergent or cleaning composition comprising the polymer of the present invention can deliver sufficient whiteness maintenance performance, when used in a wash solution comprising the carboxyl group-containing polymer at a concentration of less than about 40 ppm, preferably less than about 30 ppm, more preferably less than about 20 ppm, and even more preferably less than about 10 ppm.

Method for Preparing Carboxyl Group-Containing Polymer

The carboxyl group-containing polymer of the present invention can be prepared by copolymerizing monomer materials which essentially include specific amounts of an ether bond-containing monomer (A) represented by the formula (4), a sulfonic acid group-containing monomer (B) represented by the formula (5), and an acrylic acid-based monomer (C) represented by the formula (7) and, optionally, include a specific amount of other monomer(s) (E).

In the method for preparing the carboxyl group-containing polymer of the present invention, the amounts of the respective monomers used in the polymerization are specifically as follows. The amount of the monomer (A) is from about 0.5% to about 15% by mass, the amount of the monomer (B) is from about 0.5% to 30% by mass, and the amount of the monomer (C) is from about 55% to about 99% by mass based on 100% by mass of all the monomers (the monomers (A), (B), (C), and (E)).

Use of the monomer (A) in an amount of less than about 0.5% by mass may result in reduced adsorbability to hydrophobic soils, and therefore may result in reduced anti-soil redeposition ability, whiteness maintenance, particularly over multi-cycle washes, and detergency against hydrophobic soils. Use of the monomer (B) in an amount of less than about 0.5% by mass may result in poor anti-soil redeposition ability against hydrophilic soils leading to increase gray deposits on the washed surfaces. Use of the monomer (C) in an amount of less than about 55% by mass may result in reduced anti-soil redeposition ability and detergency against hydrophilic soils.

The amounts of the monomers (A), (B), and (C) are preferably from about 1% to about 9% by mass, from about 1% to about 23% by mass, and from about 68% to about 98% by mass, respectively, more preferably from about 2% to about 8% by mass, from about 3% to about 22% by mass, and from about 70% to about 95% by mass, respectively, and still more preferably from about 3% to about 7% by mass, from about 5% to about 21% by mass, and from about 72% to about 92% by mass, respectively.

In addition, the monomer(s) (E) may be used in an amount of from about 0% to about 34% by mass based on the 100% by mass of all the monomers (the monomers (A), (B), (C), and (E)). The amount is more preferably from about 0% to about 10% by mass, still more preferably from about 0% to about 5% by mass, and particularly preferably 0% by mass.

The polymerization method to obtain the carboxyl group-containing polymer of the present invention is not particularly limited, and a common polymerization method or a modified method thereof can be used. Examples of polymerization methods include radical polymerization. Specific examples thereof include oil-in-water emulsion polymerization, water-in-oil emulsion polymerization, suspension polymerization, dispersion polymerization, precipitation polymerization, solution polymerization, aqueous solution polymerization, and bulk polymerization. Among these polymerization methods, solution polymerization is preferable because it is a highly safe method and provides production (polymerization) cost savings.

In the case of solution polymerization, the monomers are polymerized in a solvent. The solvent may be one consisting of an organic solvent but is preferably one containing water. The solvent preferably contains at least 50% by mass of water based on the total amount (100% by mass) of the solvent, and the amount of water is more preferably at least 80% by mass. In particular, 100% by mass of water is preferable. Examples of organic solvents that can be used alone or in combination with water include aqueous organic solvents such as lower alcohols (e.g., ethanol, isopropanol), amides (e.g., N,N-dimethylformamide), ethers (e.g., diethyl ether, dioxane), glycol, glycerin, and polyethylene glycols.

Only one solvent may be used alone, or two or more solvents may be used in combination. The amount of the solvent is preferably 40 to 300 parts by mass, more preferably 45 to 200 parts by mass, and further more preferably 50 to 150 parts by mass per 100 parts by mass of all the monomers (the monomers (A), (B), (C), and (E)). The use of the solvent in an amount of less than 40 parts by mass per 100 parts by mass of all the monomers may result in production of a polymer with a high molecular weight. The use of the solvent in an amount of more than 300 parts by mass per 100 parts by mass of all the monomers may result in a low concentration of the resulting polymer, and therefore a step for removing the solvent may be required in some cases.

A portion or all of the solvent is charged in a reaction vessel at an initial stage of the polymerization, and a remaining portion of the solvent may be added (e.g., drop-wise) to the reaction system during the polymerization reaction. Alternatively, the monomers and agents such as a polymerization initiator may be dissolved in the solvent and this solution containing these components may be added (e.g., drop-wise) to the reaction system.

The reaction by solution polymerization is not particularly limited and may be carried out in a common way. The reaction is typically carried out, for example, by charging the solvent in the reaction system, and adding drop-wise containing the monomers and a polymerization initiator (hereinafter, also referred to as "initiator"). In such a case, the concentration of each solution to be added drop-wise is not particularly limited, and may be appropriately determined.

For example, in the case that the monomers and an initiator are added drop-wise to the solvent set in the reaction system, the monomer (A), the monomer (B), the monomer (C), the monomer(s) (E) (if necessary), the initiator, and other additives (if necessary) may be dissolved in solvents, respectively, or may be used as they are without dissolving in solvents, and the polymerization may be carried out by adding (drop-wise) the solutions to the reaction system during the polymerization in an appropriate manner. In this case, a portion or all of the monomer (A) may be charged in the reaction system before the start of the polymerization.

Polymerization Initiator:

In the preparation method, commonly used polymerization initiators may be used. Specifically, suitable examples thereof include hydrogen peroxide; persulfates such as sodium persulfate, potassium persulfate, and ammonium persulfate; azo compounds such as 2,2'-azobis(2-amidinopropane) hydrochloride, 4,4'-azobis-4-cyanovaleric acid, azobis isobutyronitrile, and 2,2'-azobis(4-methoxy-2,4-dimethylvaleronitrile); and organic peroxides such as benzoyl peroxide, lauroyl peroxide, peracetic acid, di-t-butyl peroxide, and cumene hydroperoxide. Hydrogen peroxide, persulfates, and 2,2'-azobis(2-amidinopropane) hydrochloride are preferable, and persulfates and 2,2'-azobis(2-amidinopropane) hydrochloride are more preferable among these polymerization initiators. Any of these polymerization initiators may be used alone, or two or more of these may be used in combination.

Chain Transfer Agent:

In the preparation method, a chain transfer agent is preferably used as a molecular weight controlling agent for the polymer. The use of a chain transfer agent advantageously prevents an increase in the molecular weight of the resulting polymer over a certain level and therefore results in more efficient production of a carboxyl group-containing polymer having low-molecular weight.

A hydrogen sulfite and/or a compound capable of producing a hydrogen sulfite is/are preferably used as chain transfer agent(s) in the preparation method. In this case, it is preferable to use a polymerization initiator in addition to the hydrogen sulfite and/or the compound capable of producing a hydrogen sulfite. Additionally, a heavy metal ion may be used in combination as a reaction accelerator as described below.

If a hydrogen sulfite and/or a compound capable of producing a hydrogen sulfite is/are used as chain transfer agent(s), the resulting polymer is terminated with a sulfonic acid (salt) group at one or both ends of its main chain.

Examples of compounds capable of producing a hydrogen sulfite include pyrosulfurous acid (salts), dithionous acid (salts), and sulfurous acid (salts). Particularly, pyrosulfurous acid (salts) are preferable.

The salts are preferably salts with metal atoms, ammonium, and organic amines. Examples of the metal atoms include monovalent alkali metal atoms such as lithium, sodium, and potassium; divalent alkaline earth metal atoms such as calcium and magnesium; and trivalent metal atoms such as aluminum and iron.

Examples of the organic amines include alkanolamines such as monoethanolamine, diethanolamine, and triethanolamine; and triethylamine.

Among hydrogen sulfites and the compounds capable of producing a hydrogen sulfite, hydrogen sulfites are preferable.

Examples of hydrogen sulfites include sodium hydrogen sulfite, potassium hydrogen sulfite, and ammonium hydrogen sulfite. Particularly, sodium hydrogen sulfite is more preferable.

Specific examples of the compounds capable of producing a hydrogen sulfite include sodium pyrosulfite and potassium pyrosulfite; sodium dithionite and potassium dithionite; and sodium sulfite, potassium sulfite, and ammonium sodium sulfite. Particularly, sodium pyrosulfite is more preferable.

Any of these hydrogen sulfites and compounds capable of producing a hydrogen sulfite may be used alone, or two or more of these may be used in combination.

In addition to a hydrogen sulfite and/or a compound capable of producing a hydrogen sulfite, any of the following compounds may also be used as a chain transfer agent. Examples of such chain transfer agents include thiol-based chain transfer agents such as mercaptoethanol, thioglycolic acid, 2-mercaptopropionic acid, 3-mercaptopropionic acid, octyl 3-mercaptopropionate, 2-mercaptoethansulfonic acid, and n-dodecyl mercaptan; halides such as carbon tetrachloride, methylene chloride, bromoform, and bromotrichloroethane; secondary alcohols such as isopropanol and glycerin; and lower oxides such as phosphorous acid, hypophosphorous acid, and salts of these (e.g., sodium hypophosphite, potassium hypophosphite). Any of these chain transfer agents may be used alone, or two or more of these may be used in combination.

Reaction Accelerator:

In the preparation method, a reaction accelerator may be added to reduce the amount of agents used in the reaction such as the polymerization initiator. Examples of reaction accelerators include heavy metal ions.

The term "heavy metal ions" used herein is intended to include metal ions having a specific gravity of not less than 4 g/cm$^3$. Preferred examples of heavy metals for the heavy metal ions include iron, cobalt, manganese, chromium, molybdenum, tungsten, copper, silver, gold, lead, platinum, iridium, osmium, palladium, rhodium, and ruthenium. Any of these heavy metals may be used alone, or two or more of these may be used in combination. Among these, iron is more preferable.

The ionic valency of the heavy metal ions is not particularly limited. For example, when iron is used as a heavy metal, the reaction accelerator may include iron ion in the Fe$^{2+}$ form, or Fe$^{3+}$ form, or may include iron ions in both forms.

These heavy metal ions may be used in any forms, provided that they are present in ion forms. For handleability, these heavy metal ions are preferably used in solution forms obtained by dissolving heavy metal compounds. The heavy metal compounds are any compounds, provided that they each contain a desired heavy metal that is to be captured in a polymerization initiator. Appropriate one can be selected according to a polymerization initiator used in combination.

When iron ion is used as a heavy metal ion, preferred examples of heavy metal compounds include Mohr's salt (Fe(NH$_4$)$_2$(SO$_4$)$_2$.6H$_2$O), ferrous sulfate heptahydrate, ferrous chloride, and ferric chloride. When manganese is used as a heavy metal ion, manganese chloride or the like is suitable. All of these are water-soluble compounds and therefore are used in aqueous solution forms and easy to handle. Solvents used to prepare a solution of a heavy metal compound are not limited to water, provided that they dissolve the heavy metal compound and do not inhibit the polymerization reaction in the preparation of the carboxyl group-containing polymer of the present invention.

A heavy metal ion may be added in any manner. Preferably, all of the heavy metal ion is added before the completion of addition of the monomers. More preferably, the heavy metal ion is charged all at once at the start of the reaction.

The amount of the heavy metal ion is preferably 0.1 to 10 ppm per the total amount of the polymerization reaction solution at the completion of the polymerization. If the amount of the heavy metal ion is less than 0.1 ppm, the effect by the heavy metal ion may not be provided enough. If the amount of the heavy metal ion is more than 10 ppm, the color tone of the resulting polymer may be deteriorated. Furthermore, polymers produced with excess heavy metal ions may cause colored soils when used as detergent builders.

The term "at the completion of the polymerization" means the time when the polymerization reaction in the polymerization reaction solution substantially ends such that the desired polymer is provided. For example, in the case that the polymer produced in the polymerization reaction solution is neutralized with an acid component, the amount of the heavy metal ion is determined based on the total amount of the polymerization reaction solution after the neutralization. In the case that two or more heavy metal ions are contained, the total amount of the heavy metal ions are within the above range.

In the preparation method, other compounds such as catalysts for decomposing the polymerization initiator and reducing compounds may be added in the reaction system upon the polymerization reaction in addition to the above-mentioned compounds.

Examples of catalysts for decomposing the polymerization initiator include halogenated metals such as lithium chloride and lithium bromide; metal oxides such as titanium oxide and silica dioxide; metal salts of inorganic acids such as hydrochloric acid, hydrobromic acid, perchloric acid, sulfuric acid, and nitric acid; carboxylic acids such as formic acid, acetic acid, propionic acid, butyric acid, isobutyric acid, and benzoic acid, and esters and metal salts thereof; and heterocyclic amines such as pyridine, indole, imidazole, and carbazole, and derivatives thereof. Any of these decomposition catalysts may be used alone, or two or more of these may be used in combination.

Examples of reducing compounds include organic metal compounds such as ferrocene; inorganic compounds capable of generating metal ions (e.g., iron, copper, nickel, cobalt, manganese ions) such as iron naphthenate, copper naphthenate, nickel naphthenate, cobalt naphthenate, and manganese naphthenate; inorganic compounds such as ether adducts of boron trifluoride, potassium permanganate, and perchloric acid; sulfur-containing compounds such as sulfur dioxide, sulfuric acid esters, thiosulfuric acid salts, sulfoxylates, benzene sulfinic acid and substituted compounds thereof, and analogues of cyclic sulfinic acids such as p-toluene sulfinic acid; nitrogen-containing compounds such as hydrazine, β-hydroxyethylhydrazine, and hydroxylamine; aldehydes such as formaldehyde, propionaldehyde, n-butylaldehyde, isobutylaldehyde, and isovalerianaldehyde; and ascorbic acid. Any of these reducing compounds may be used alone, or two or more of these may be used in combination.

The combination of the chain transfer agent, the polymerization initiator, and the reaction accelerator is not particularly limited, and each of them can be suitably selected from the above examples. Either the polymerization initiator or the reaction accelerator may not be used. Preferred examples of the combination of the chain transfer agent, the polymerization initiator, and the reaction accelerator (written in this order) include sodium hydrogen sulfite/hydrogen peroxide/none, sodium hydrogen sulfite/sodium persulfate/none, sodium hydrogen sulfite/none/Fe (ion), sodium hydrogen sulfite/hydrogen peroxide/Fe (ion), sodium hydrogen sulfite/sodium persulfate/Fe (ion), and sodium hydrogen sulfite/sodium persulfate and hydrogen peroxide/Fe (ion). The combinations of sodium hydrogen sulfite/sodium persulfate/none and sodium hydrogen sulfite/sodium persulfate/Fe (ion) are more preferable, and the combination of sodium hydrogen sulfite/sodium persulfate/Fe (ion) is still more preferable. Here, "none" means that nothing is used as the corresponding agent.

Amount of Polymerization Initiator and Other Agents:

The amount of the polymerization initiator is not particularly limited, provided that it is enough to initiate the copolymerization of the monomers. The amount of the polymerization initiator is preferably not more than 15 g per mol of all the monomers (the monomers (A), (B), (C) and (E)), and more preferably 1 g to 12 g.

In the case that hydrogen peroxide is used as the polymerization initiator, the amount of hydrogen peroxide is 1.0 g to 10.0 g per mol of all the monomers, and more preferably 2.0 g to 8.0 g. If the amount of hydrogen peroxide is less than 1.0 g, the resulting polymer tends to have a high weight average molecular weight. On the other hand, addition of more than 10.0 g of hydrogen peroxide may not produce an effect proportional to the added amount and cause disadvantages such as a large amount of hydrogen peroxide remaining unreacted.

When a persulfate is used as the polymerization initiator, the amount of the persulfate is preferably 1.0 g to 5.0 g, and more preferably 2.0 g to 4.0 g per mol of all the monomers. If the amount of the persulfate is less than 1.0 g, the resulting polymer tends to have a high molecular weight. On the other hand, addition of more than 5.0 g of the persulfate may not produce an effect proportional to the added amount and cause disadvantages such as low purity of the resulting polymer.

In the case that hydrogen peroxide and a persulfate are used in combination as the polymerization initiators, the mass ratio of the persulfate to hydrogen peroxide is preferably 0.1 to 5.0, and more preferably 0.2 to 2.0. If the mass ratio of the persulfate is less than 0.1 g, the resulting copolymer tends to have a high molecular weight. On the other hand, addition of the persulfate at a mass ratio of more than 5.0 may not produce a molecular weight reducing effect proportional to the added amount, and therefore the persulfate may be wasted in vain in the polymerization reaction system.

Regarding addition of hydrogen peroxide, it is preferable to almost continuously add hydrogen peroxide drop-wise in an amount of not less than 85% by mass of the predetermined required amount. The amount is more preferably not less than 90% by mass, and further more preferably 100% by mass (i.e., hydrogen peroxide is preferably all added drop-wise). In the case that hydrogen peroxide is continuously added drop-wise, the drop rate may be changed.

It is preferable to start drop-wise addition of hydrogen peroxide after a certain time period from the start of drop-wise addition of the monomers (other than monomers charged at the start of the reaction) when the reaction is carried out under suitable reaction conditions described below (e.g., temperature, pressure, pH). Specifically, drop-wise addition of hydrogen peroxide is preferably started after not less than one minute from the start of drop-wise addition of the monomer (C), more preferably after not less than three minutes from the start, further more preferably after not less than five minutes from the start, and particularly preferably after not less than ten minutes from the start. The time period before the start of drop-wise addition of hydrogen peroxide allows smooth initiation of the polymerization at the initial stage, which in turn leads to a narrow molecular weight distribution. The time period before the start of drop-wise addition of hydrogen peroxide is preferably not longer than 60 minutes, more preferably not longer than 30 minutes from the start of drop-wise addition of the monomer.

However, drop-wise addition of hydrogen peroxide may be simultaneously started with drop-wise addition of the monomers, or a portion of hydrogen peroxide may be charged in the reaction system before the start of drop-wise addition of the monomers. In the case that a portion of hydrogen peroxide is charged in the reaction system in advance, the amount is preferably not more than 10% by mass of the predetermined required amount, more preferably not more than 7% by mass, still more preferably not more than 5% by mass, and particularly more preferably not more than 3% by mass.

For example, in the case that hydrogen peroxide is used with a persulfate, the polymerization may be terminated by adding hydrogen peroxide in an amount of more than 10% by mass of the predetermined required amount before the start of drop-wise addition of the monomers because of a high hydrogen peroxide concentration relative to the persulfate. If hydrogen peroxide is added after more than 60 minutes from the start of drop-wise addition of the monomers, reactions such as a chain transfer reaction caused by hydrogen peroxide may not start. As a result, polymers produced at an initial stage of the polymerization may have high molecular weights.

Preferably, the drop-wise addition of hydrogen peroxide is completed simultaneously with the completion of drop-wise addition of the monomers when the reaction is carried out under the suitable reaction conditions described below (e.g., temperature, pressure, pH). The addition of hydrogen peroxide is more preferably completed not less than 10 minutes before the completion of drop-wise addition of the monomers, and further more preferably not less than 30 minutes before the completion. Even if the drop-wise addition of hydrogen peroxide is completed after the completion of drop-wise addition of the monomers, the polymerization system does not suffer from any disadvantages. However, a portion of added hydrogen peroxide remains undecomposed at the completion of the polymerization. Unreacted hydrogen peroxide does not produce the effect and is used in vain. Additionally, if a large amount of hydrogen peroxide remains, the remaining hydrogen peroxide disadvantageously affects the thermal stability of the resulting polymer.

In the case of using a persulfate, the method for adding the persulfate is not particularly limited. However, it is preferable to almost continuously add the persulfate drop-wise in an amount of at least 50% by mass of the predetermined required amount based on a consideration of its decomposability and the like. The amount is more preferably at least 80% by mass, and still more preferably 100% by mass (i.e., the persulfate is preferably all added drop-wise). In the case that the persulfate is continuously added drop-wise, the drop rate may be changed.

The drop-wise addition time is also not particularly limited. Since the persulfate is an initiator to be decomposed in a comparatively short time when the reaction is carried out under the suitable reaction conditions described below (e.g., temperature, pressure, pH), it is preferable to continue drop-wise addition of the persulfate until the completion of drop-wise addition of the monomers. It is more preferable to complete drop-wise addition of the persulfate within 30 minutes after the completion of drop-wise addition of the monomers, and is particularly preferable to complete the addition within 5 to 20 minutes after the completion of drop-wise addition of the monomers. Through such a process, the amount of residual monomers in the resulting polymer solution can be strikingly reduced.

Even if drop-wise addition of the initiator is completed before the completion of drop-wise addition of the monomers, the polymerization does not suffer from any disadvantages. The timing of the completion of drop-wise addition of the initiator can be determined according to the amount of residual monomers in the resulting polymer solution.

The starting time of drop-wise addition of the polymerization initiator is not particularly limited and is appropriately determined. For example, drop-wise addition of the initiator may be started before drop-wise addition of the monomers. When two or more initiators are used in combination, a certain time after the start of drop-wise addition of one of the initiators or after the completion of drop-wise addition of this initiator, drop-wise addition of the other initiator(s) may be started. In each case, the starting time of drop-wise addition of initiator(s) can be appropriately determined according to the decomposition speed of the initiator(s) and the reactivity of the monomers.

In the case that the polymerization initiator is added drop-wise, the concentration of the initiator solution is not particularly limited and is preferably 5% to 60% by mass, and more preferably 10% to 50% by mass. In the polymerization reaction, when initiator concentrations is less than 5% by mass, the initiator solution contains a solvent at a high concentration, resulting in low concentrations of the monomers. In this case, the polymerizability of the monomers may be strikingly low, and a remarkably large portion of the monomers may remain in the resulting polymer solution. Such concentrations are disadvantageous in terms of cost because of low transportation efficiency and productivity. Concentrations of more than 60% by mass are disadvantageous in terms of safety and handleability upon drop-wise addition.

The amount of the chain transfer agent is not particularly limited, provided that it is determined such that the monomers (A), (B), (C), and (E) are allowed to polymerize well. The amount of the chain transfer agent is preferably 1 g to 20 g, and more preferably 2 g to 15 g per mol of all the monomers (the monomers (A), (B), (C), and (E)). If the amount of the chain transfer agent is less than 1 g, the molecular weight of the resulting polymer may not be controlled. On the other hand, the use of more than 20 g of the chain transfer agent may result in large amounts of impurities and therefore lead to low purity of the resulting polymer. Especially, when more than 20 g of a hydrogen sulfite is used, excess hydrogen sulfite is decomposed in the reaction system, which may disadvantageously result in generation of sulfur dioxide gas. In addition, the use of more than 20 g of the chain transfer agent may be disadvantageous in terms of cost.

A preferable combination of the initiator and the chain transfer agent is one or more of persulfates and one or more of hydrogen sulfites.

In this case, the blending ratio between the persulfate(s) and the hydrogen sulfite(s) is not particularly limited. Preferably, 0.5 to 5 parts by mass of the hydrogen sulfite(s) is/are used with respect to 1 part by mass of the persulfate(s). The lower limit of the amount of the hydrogen sulfite(s) is more preferably 1 part by mass, and is further more preferably 2 parts by mass with respect to 1 part by mass of the persulfate(s). The upper limit of the amount of the hydrogen sulfite(s) is more preferably 4 parts by mass, and further more preferably 3 parts by mass with respect to 1 part by mass of the persulfate(s). If less than 0.5 parts by mass of the hydrogen sulfite(s) is/are used with respect to 1 part by mass of the persulfate(s), the total initiator amount required to produce a lower-molecular weight polymer may increase. On the other hand, the use of more than 5 parts by mass of the hydrogen sulfite(s) may increase side reactions and therefore increase impurities produced in the side reactions.

The total amount of the chain transfer agent, the initiator, and the reaction accelerator is preferably 2 g to 20 g per mol of all the monomers (A), (B), (C), and (E). If these agents are used in an amount within this range, the carboxyl group-containing polymer of the present invention can be efficiently produced, and the molecular weight distribution of the polymer can be controlled within a desired range. The total amount of them is more preferably 4 g to 18 g, and further more preferably 6 g to 15 g.

In the preparation method, the monomers, the polymerization initiator, and the chain transfer agent may be added in a reaction vessel by continuous addition such as drop-wise addition and portion-wise addition. Each of them may be separately charged in the reaction vessel, or they may be mixed with other materials or in a solvent or the like in advance.

Specifically, these materials may be added by methods such as a method including charging all the monomers into the reaction vessel and adding the polymerization initiator to the reaction vessel to copolymerize the monomers; a method including charging a portion of the monomers into the reaction vessel, and adding the polymerization initiator and the remaining monomers continuously or portion-wise (preferably, continuously) to the reaction vessel to copolymerize the monomers; and a method including charging a polymerization solvent into the reaction vessel, and adding all of the monomers and the polymerization initiator. Among these methods, the method including continuously adding the polymerization initiator and the monomers drop-wise into the reaction vessel to copolymerize the monomers is preferable because it provides polymers having a narrow (i.e., sharp) molecular weight distribution and improves the dispersibility of soils and anti-soil redeposition ability, and enhances the whiteness maintenance when the polymers are formulated in products. Polymerization may be batchwise polymerization or continuous polymerization.

Polymerization Condition:

In the preparation method, the polymerization temperature is appropriately determined based on factors such as the polymerization method, the solvent, and the polymerization initiator. The polymerization temperature is preferably 25° C. to 200° C., more preferably 50° C. to 150° C., further more preferably 60° C. to 120° C., and particularly preferably 80° C. to 110° C. At polymerization temperatures of lower than 25° C., the resulting polymer may have too high weight average molecular weight and larger amounts of impurities may be produced.

The polymerization temperature is not necessarily kept substantially constant throughout the polymerization reaction. For example, the temperature may be set at room temperature at the start of the polymerization, and increased to a target temperature at an appropriate temperature rising rate or over an appropriate temperature rising time, and then kept at the target temperature. Alternatively, the temperature may be altered (i.e., increased or decreased) with a lapse of time during the polymerization reaction depending on the method for the drop-wise addition of the monomers, the initiator, and the like.

The term "polymerization temperature" used herein means the temperature of the reaction solution during the polymerization reaction. The method for measuring the polymerization temperature and means for controlling the polymerization temperature may be appropriately selected from any methods and controlling means. For example, the polymerization temperature can be measured with a common device.

The pressure during the polymerization in the preparation method is not particularly limited and can be suitably determined. For example, the pressure may be any of ambient pressure (e.g., atmospheric pressure), reduced pressure, and increased pressure. The atmosphere in the reaction system may be an air or inert gas atmosphere. In order to produce an inert gas atmosphere in the reaction system, the air in the system is replaced with an inert gas such as nitrogen before the start of the polymerization, for example. In this atmosphere, the atmospheric gas (such as oxygen gas) in the reaction system dissolves in the liquid phase and serves as a polymerization inhibitor.

In the preparation method, the solids content of the reaction solution (polymer solution) at the completion of addition of the monomers, the polymerization initiator and the chain transfer agent is preferably not less than 35% by mass. In the case that the solids content is less than 35% by mass, the productivity of the resulting polymer may not be strikingly improved. The solids content is more preferably 40% to 70% by mass, and further more preferably 45 to 65% by mass. When solids contents is not less than 35% by mass at the completion of addition of the monomers, the polymerization initiator and the chain transfer agent, the polymerization can be performed in one step in a high concentration reaction solution. Namely, the polymer can be effectively produced. In this case, steps such as a concentration step can be omitted, which in turn leads to remarkable improvement in the productivity of the polymer and suppresses an increase in the production cost.

The solids content can be calculated by sampling a portion of the reaction solution after completion of the drop-wise addition, and quantifying nonvolatile matters after one-hour treatment with a hot air dryer at 130° C.

In the preparation method, a maturing step may be performed to improve the polymerization rate of the monomers and the like after addition of all the raw materials. The maturing time is preferably 1 to 120 minutes, more preferably 5 to 60 minutes, and further more preferably 10 to 30 minutes. Maturing for less than one minute is insufficient such that portion of the monomers may remain. Consequently, impurities derived from the remaining monomers may deteriorate performance of the product. Maturing for more than 120 minutes may result in a colored polymer solution.

In the preparation method, the polymerization time is not particularly limited, and is preferably 30 to 420 minutes, more preferably 45 to 390 minutes, further more preferably 60 to 360 minutes, and still further more preferably 90 to 300 minutes. The term "polymerization time" used herein means a time in which the monomers are being added, that is, a time from the start to the end of addition of the monomers.

Uses of Carboxyl Group-Containing Polymer

The carboxyl group-containing polymer and the composition containing the polymer of the present invention can be used as a coagulant, printing ink, adhesive, soil control (i.e., modification) agent, fire retardant, skin care agent, hair care agent, additive for shampoos, hair sprays, soaps, and cosmetics, anion exchange resin, dye mordant and auxiliary agent for fibers and photographic films, pigment dispersant for paper making, paper reinforcing agent, emulsifier, preservative, softening agent for textiles and paper, additive for lubricants, water treatment agent, fiber treating agent, dispersant, scale control agent (i.e., scale depressant), metal ion binding agent, viscosity improver, binder of any type, emulsifier, and the like.

In one preferable modification, the carboxyl group-containing polymer composition comprises from about 40% to about 60% by mass of the carboxyl group-containing polymer and from about 38.5% to about 59.99% by mass of water.

Water Treatment Agent

The carboxyl group-containing polymer and the composition containing the polymer of the present invention can be used in water treatment agents. In these water treatment agents, other additives such as polyphosphates, phosphonates, anti-corrosion agents, slime control agents, and chelating agents may be added, if necessary.

Such water treatment agents are useful for scale inhibition of cooling water circulation systems, boiler water circulation systems, seawater desalination plants, pulp digesters, black liquor condensing kettles and the like. In addition, any suitable water soluble polymer may be included within a range of not affecting the performance or effect of this composition.

Fiber Treating Agent

The carboxyl group-containing polymer and the composition containing the polymer of the present invention can be used in fiber treating agents. Such fiber treating agents contain at least one selected from the group consisting of dyeing agents, peroxides, and surfactants, in addition to the carboxyl group-containing polymer or the composition containing the polymer of the present invention.

In these fiber treating agents, the carboxyl group-containing polymer of the present invention preferably constitutes from about 1% to about 100% by mass, and more preferably from about 5% to about 100% by mass of the total amount. In addition, any suitable water soluble polymer may be included within a range of not affecting the performance or effect of this composition.

An example of the amounts of components in these fiber treating agents is described below. The fiber treating agents can be used in steps of scouring, dyeing, bleaching and soaping in fiber treatment. Examples of dyeing agents, peroxides, and surfactants include those commonly used in fiber treating agents.

Regarding the blending ratio (in solid content) between the carboxyl group-containing polymer composition of the present invention and at least one selected from the group consisting of dyeing agents, peroxides, and surfactants, for example, a composition that contains at least one selected from the group consisting of dyeing agents, peroxides, and surfactants at a level of 0.1 to 100 parts by mass per part by mass of the composition of the present invention is preferable as a fiber treatment agent in terms of improvement in whiteness, color uniformity, and dyeing fastness of fibers.

Such a fiber treating agent can be used for any suitable fibers including cellulosic fibers such as cotton and hemp, synthetic fibers such as nylon and polyester, animal fibers such as wool and silk thread, semi-synthetic fibers such as rayon, and textiles and mixed products of these.

For a fiber treating agent used in a scouring step, an alkali agent and a surfactant are preferably used together with the polymer of the present invention. For a fiber treating agent used in a bleaching step, a peroxide and a silicic acid-based agent (e.g., sodium silicate) which serves as a decomposition inhibitor for alkaline bleaches are preferably used with the composition of the present invention.

Inorganic Pigment Dispersant

The carboxyl group-containing polymer and the composition containing the polymer of the present invention can be used in inorganic pigment dispersants. In these inorganic pigment dispersants, other additives such as condensed phosphoric acid and salts thereof, phosphonic acid and salts thereof, and polyvinyl alcohol may be added, if necessary.

In these inorganic pigment dispersants, the carboxyl group-containing polymer of the present invention preferably constitutes from about 5% to about 100% by mass of the total amount. In addition, any suitable water soluble polymer may be included within a range of not affecting the performance or effect of this composition.

These inorganic pigment dispersants exhibit good performance as inorganic pigment dispersants for heavy or light calcium carbonate and clay used for paper coating. For example, by adding such an inorganic pigment dispersing agent in a small amount to inorganic pigments and dispersing them in water, a highly concentrated inorganic pigment slurry such as a highly concentrated calcium carbonate slurry having low viscosity, high fluidity, and excellent temporal stability of these properties can be produced.

When such an inorganic pigment dispersant is used as a dispersant for inorganic pigments, the amount of the inorganic pigment dispersant is preferably 0.05 to 2.0 parts by mass per 100 parts by mass of inorganic pigments. The use of the inorganic pigment dispersant in an amount within this range provides a sufficient dispersion effect proportional to the added amount and is advantageous in terms of cost.

Detergent Builder

The carboxyl group-containing polymer and the composition containing the polymer of the present invention can be also used as detergent builders. These detergent builders can be added to detergents for various usages such as detergents for clothes, tableware, cleaning, hair, bodies, toothbrushing, and vehicles.

Laundry Detergent or Cleaning Composition

In a preferred embodiment, the carboxyl group-containing polymer can be added to laundry detergent or cleaning composition of the present invention. The content of the carboxyl group-containing polymer in the laundry detergent or cleaning composition is not particularly limited, but may further comprise one or more components other than the carboxyl group-containing polymer and the hydrogen sulfite adduct. Examples of other components include, but are not particularly limited to, residual polymerization initiator, residual monomers, by-products of the polymerization, and water.

From the standpoint of manifesting improved anti-soil redeposition and whiteness maintenance performance, the content of an adduct of a hydrogen sulfite to the acrylic acid-based monomer (C), is preferably present at a level of from about 0.01% to about 1.5% by mass based on 100% by mass of the total content of the carboxyl group-containing polymer and the adduct of a hydrogen sulfite to the acrylic acid-based monomer (C). The hydrogen sulfite adduct at a level in the above range improves the detergency against soils. The level is preferably from about 0.02% to about 1.0% by mass, and more preferably from about 0.03% to about 0.8% by mass.

The adduct of a hydrogen sulfite to the acrylic acid-based monomer (C) (hereinafter, also referred to as "hydrogen sulfite adduct") of the polymer is an impurity derived from the acrylic acid-based monomer (C) which remains unpolymerized, although the above hydrogen sulfite and/or the compound capable of producing a hydrogen sulfite as a chain transfer agent is added thereto. Specific examples thereof include 3-sulfopropionic acid (salts) and the like.

While the level of the polymer in the laundry detergent or cleaning composition is not particularly limited, in terms of improvement in anti-soil redeposition ability and whiteness maintenance, the level of the carboxyl group-containing polymer is from about 1% to about 99.99% by mass based on 100% by mass of the total laundry detergent or cleaning composition. The level of the polymer is preferably from about 0.1% to about 20%, or from about 0.2% to about 18%, or from about 0.3% to about 12%, or from about 0.4% to about 5% of the carboxyl group-containing polymer.

Laundry Detergent and Cleaning Compositions Comprising the Polymer

The laundry detergent or cleaning composition of the present invention comprises the carboxyl group-containing polymers, and, optionally, other adjunct ingredients. The laundry detergents or cleaning compositions can be in any form, namely, in the form of a liquid; a solid such as a powder, granules, agglomerate, paste, tablet, pouches, bar, gel; an emulsion; types delivered in dual- or multi-compartment containers or pouches; a spray or foam detergent; pre-moistened wipes (i.e., the cleaning composition in combination with a nonwoven material such as that discussed in U.S. Pat. No. 6,121,165, Mackey, et al.); dry wipes (i.e., the cleaning composition in combination with a nonwoven materials, such as that discussed in U.S. Pat. No. 5,980,931, Fowler, et al.) activated with water by a consumer; and other homogeneous or multiphase consumer cleaning product forms.

Embodiments of the Laundry Detergent and Cleaning Compositions

Of the various aspects of the invention set forth above in the Summary of the Invention, certain embodiments are preferred.

In one embodiment of the invention is the laundry detergent or cleaning composition, as set forth above in the Summary of the Invention, comprising the carboxyl group-containing polymer, wherein the polymer comprises:
i. the structure unit (a) as represented by the formula (1) wherein $R^0$ is a hydrogen atom; $R^1$ is a $CH_2$ group; X is a hydroxyl group; and Y is formula (2); and formula (2) wherein n is 0; and $R^3$ is a $C_1$-$C_4$ alkyl group, preferably a butyl;
ii. the structure unit (b) as represented by the formula (5):

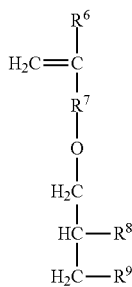

(5)

wherein $R^6$ represents a hydrogen atom or a methyl group; $R^7$ represents a $CH_2$ group, a $CH_2CH_2$ group, or a direct bond; $R^8$ and $R^9$ independently represent a hydroxyl group or —$SO_3Z$; Z represents a hydrogen atom, a metal atom, an ammonium group, or an organic amine group; and at least one of $R^8$ and $R^9$ is —$SO_3Z$; and iii. the structure unit (c) as represented by formula (8):

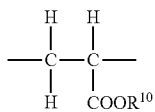

(8)

wherein $R^{10}$ represents a hydrogen atom, a metal atom, an ammonium group, or an organic amine group.

In an aspect of this embodiment, is a laundry detergent or cleaning composition wherein the carboxyl group-containing polymer comprises a structure unit (b) which is selected from the group comprising of vinylsulfonic acid, styrenesulfonic acid, (meth)allylsulfonic acid, 3-(meth)allyloxy-2-hydroxypropane sulfonic acid, 3-(meth)allyloxy-1-hydroxypropanesulfonic acid, 2-(meth)allyloxyethylenesulfonic acid, and 2-acrylamide-2-methylpropanesulfonic acid, wherein preferably structure unit (b) is 3-(meth)allyloxy-2-hydroxypropanesulfonic acid.

Another embodiment of the invention is a laundry detergent or cleaning composition, as set forth above in the Summary of the Invention, wherein the carboxyl group-containing polymer comprises:
i. the structure unit (a) preferably from about 1 to about 9%, more preferably from about 2 to about 8%, and even more preferably from about 3% to about 7% by mass;
ii. the structure unit (b) preferably from about 1 to about 23%, more preferably from about 3 to about 22%, and even more preferably from about 5 to about 21% by mass; and
iii. the structure unit (c) preferably from about 68% to about 98%, more preferably from about 70% to about 95%, and even more preferably from about 72% to about 92% by mass.

In an aspect of this embodiment, is a laundry detergent or cleaning composition, wherein the carboxyl group-containing polymer comprises:
i. the structure unit (a) even more preferably from about 3% to about 7% by mass;
ii. the structure unit (b) even more preferably from about 5% to about 21% by mass; and
iii. the structure unit (c) even more preferably from about 72% to about 92% by mass.

In another embodiment, the laundry detergent or cleaning composition of the present invention comprising the carboxyl group-containing polymer have high performance when used in aqueous environment. In addition, the carboxyl group-containing polymers have improved high hard water resistance, anti-soil redeposition ability, clay dispersibility, stain removal, and interaction with surfactants and therefore exhibit better performance when used in laundry detergents or cleaning compositions of the present invention.

In another embodiment, the laundry detergent or cleaning composition is a liquid or solid composition.

In another embodiment, the laundry detergent of the present invention includes granular or powder-form all-purpose or "heavy-duty" washing agents, especially cleaning detergents as well as cleaning auxiliaries, for example, bleach additives, fabric softeners and fabric treatment liquids, or pre-treat or post-treat types. In one aspect, the laundry detergent is a solid laundry detergent composition, for example, and preferably a free-flowing particulate laundry detergent composition (i.e., a granular detergent product). In another aspect, the laundry detergent includes synthetic and soap-based laundry bars, In another embodiment, the laundry detergent of the present invention relates to a gel detergent composition comprising an organic solvent selected from the group consisting of low molecular weight aliphatic or aromatic alcohols, low molecular weight alkylene glycols, low molecular weight alkylene glycol ethers, low molecular weight esters, low molecular weight alkylene amines, low molecular weight alkanolamines, and mixtures thereof.

In another embodiment, the cleaning composition of the present invention is a hard surface cleaning composition, preferably wherein the hard surface cleaning composition impregnates a nonwoven substrate. As used herein "impregnate" means that the hard surface cleaning composition is placed in contact with a nonwoven substrate such that at least a portion of the nonwoven substrate is penetrated by the hard surface cleaning composition, preferably the hard surface cleaning composition saturates the nonwoven substrate.

In another embodiment, the cleaning composition may also be utilized in car care compositions, for cleaning various surfaces, such as, for example, hard wood, tile, ceramic, plastic, leather, metal, or glass.

In another embodiment, the cleaning composition of the present invention is a dish cleaning composition, for example, liquid hand dishwashing compositions, solid automatic dishwashing compositions, liquid automatic dishwashing compositions, or tab/unit dose forms of automatic dishwashing compositions.

In another embodiment, the cleaning composition of the present invention is a personal care or pet care composition, for example, shampoo composition, hair rinses, mouthwashes, denture cleaners, body wash (e.g., shower gels and foam baths), or liquid or solid soap.

In another embodiment, the cleaning composition of the present invention is one that comes into contact with free hardness and/or requires hardness tolerant surfactant systems, for example, compositions comprising metal cleaners, oil cleaners, corrosion inhibitors, or anti-tarnish aids.

In another embodiment, the cleaning composition of the present invention is an automotive care compositions, for example, car shampoos.

In another embodiment, the cleaning composition of the present invention is a household care composition, for example, bathroom cleaners, or carpet shampoos.

Specific embodiments of the invention are described in more detail below in the Examples section.

Making the Laundry Detergent or Cleaning Composition Comprising the Polymer

In an embodiment, cleaning compositions of all kinds require several adjuncts. Common cleaning adjuncts include builders, enzymes, polymers not discussed above, bleaches, bleach activators, catalytic materials and the like. Other cleaning adjuncts herein can include suds boosters, suds suppressors (antifoams) and the like, diverse active ingredients or specialized materials such as dispersant polymers (e.g, from BASF Corp. or Rohm & Haas) other than those described above, color speckles, silvercare, anti-tarnish and/or anti-corrosion agents, dyes, fillers, germicides, alkalinity sources, hydrotropes, anti-oxidants, enzyme stabilizing agents, pro-perfumes, perfumes, solubilizing agents, carriers, processing aids, pigments, and, for liquid formulations, solvents, chelating agents, dye transfer inhibiting agents, dispersants, brighteners, suds suppressors, dyes, structure elasticizing agents, fabric softeners, anti-abrasion agents, hydrotropes, processing aids, and other fabric care agents, surface and skin care agents. Suitable examples of such other cleaning adjuncts and levels of use are found in U.S. Pat. Nos. 5,576,282; 6,306,812 B1 and 6,326,348 B1.

In another embodiment, a finished granular detergent product is made by mixing the carboxyl group-containing polymer with optional dry admix ingredients and/or optional liquid spray-on ingredients. Finished granular detergent product are typically formulated such that, during use in aqueous cleaning operations, the wash water will have a pH of between about 6.5 and about 12, or between about 7.5 and 10.5. Techniques for controlling pH at recommended usage levels include, but are not limited to, the use of buffers, alkalis, acids, etc., and are well known to those skilled in the art. See Example 5 for sample formulations.

Typically, the laundry detergent is a fully formulated laundry detergent composition, not a portion thereof such as a spray-dried or agglomerated particle that only forms part of the laundry detergent composition. However, it is within the scope of the present invention for an additional rinse additive composition (e.g., fabric conditioner or enhancer), or a main wash additive composition (e.g., bleach additive) to also be used in combination with the laundry detergent composition during the method of the present invention. Although, it may be preferred for no bleach additive composition is used in combination with the laundry detergent composition during the method of the present invention.

Typically, the laundry detergent composition comprises a plurality of chemically different particles, such as spray-dried base detergent particles and/or agglomerated base detergent particles and/or extruded base detergent particles, in combination with one or more, typically two or more, or three or more, or four or more, or five or more, or six or more, or even ten or more particles selected from: surfactant particles, including surfactant agglomerates, surfactant extrudates, surfactant needles, surfactant noodles, surfactant flakes; polymer particles such as cellulosic polymer particles, polyester particles, polyamine particles, terephthalate polymer particles, polyethylene glycol polymer particles; builder particles, such as sodium carbonate and sodium silicate co-builder particles, phosphate particles, zeolite particles, silicate salt particles, carbonate salt particles; filler particles such as sulphate salt particles; dye transfer inhibitor particles; dye fixative particles; bleach particles, such as percarbonate particles, especially coated percarbonate particles, such as percarbonate coated with carbonate salt, sulphate salt, silicate salt, borosilicate salt, or any combination thereof, perborate particles, bleach catalyst particles such as transition metal bleach catalyst particles, or oxaziridinium-based bleach catalyst particles, pre-formed peracid particles, especially coated pre-formed peracid particles, and co-bleach particles of bleach activator, source of hydrogen peroxide and optionally bleach catalyst; bleach activator particles such as oxybenzene sulphonate bleach activator particles and tetra acetyl ethylene diamine bleach activator particles; chelant particles such as chelant agglomerates; hueing dye particles; brightener particles; enzyme particles such as protease prills, lipase prills, cellulase prills, amylase prills, mannanase prills, pectate lyase prills, xyloglucanase prills, bleaching enzyme prills, cutinase prills and co-prills of any of these enzymes; clay particles such as montmorillonite particles or particles of clay and silicone; flocculant particles such as polyethylene oxide particles; wax particles such as wax agglomerates; perfume particles such as perfume microcapsules, especially melamine formaldehyde-based perfume microcapsules, starch encapsulated perfume accord particles, and pro-perfume particles such as Schiff base reaction product particles; aesthetic particles such as coloured noodles or needles or lamellae particles, and soap rings including coloured soap rings; and any combination thereof.

Detergent ingredients: The composition typically comprises detergent ingredients. Suitable detergent ingredients include: detersive surfactants including anionic detersive surfactants, non-ionic detersive surfactants, cationic detersive surfactants, zwitterionic detersive surfactants, amphoteric detersive surfactants, and any combination thereof; polymers including carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in a ratio of 1:4:1, hexamethylenediamine derivative polymers, and any combination thereof; builders including zeolites, phosphates, citrate, and any combination thereof; buffers and alkalinity sources including carbonate salts and/or silicate salts; fillers including sulphate salts and bio-filler materials; bleach including bleach activators, sources of available oxygen, pre-formed peracids, bleach catalysts, reducing bleach, and any combination thereof; chelants; photobleach; hueing agents; brighteners; enzymes including proteases, amylases, cellulases, lipases, xylogucanases, pectate lyases, mannanases, bleaching enzymes, cutinases, and any combination thereof; fabric softeners including clay, silicones, quaternary ammonium fabric-softening agents, and any combination thereof; flocculants such as polyethylene oxide; perfume including starch encapsulated perfume accords, perfume microcapsules, perfume loaded zeolites, schif base reaction products of ketone perfume raw materials and polyamines, blooming perfumes, and any combination thereof; aesthetics including soap rings, lamellar aesthetic particles, geltin beads, carbonate and/or sulphate salt speckles, coloured clay, and any combination thereof: and any combination thereof.

Detersive surfactant: The composition typically comprises detersive surfactant. Suitable detersive surfactants include anionic detersive surfactants, non-ionic detersive surfactant, cationic detersive surfactants, zwitterionic detersive surfactants, amphoteric detersive surfactants, and any combination thereof.

Anionic detersive surfactant: Suitable anionic detersive surfactants include sulphate and sulphonate detersive surfactants.

Preferably, the quantity of anionic detersive surfactant is in the range of from 5% to 50% by weight of the total composition. More preferably, the quantity of anionic surfactant is in the range of from about 8% to about 35% by weight.

Suitable sulphonate detersive surfactants include alkyl benzene sulphonate, such as $C_{10-13}$ alkyl benzene sulphonate. Suitable alkyl benzene sulphonate (LAS) is obtainable, or even obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. Another suitable anionic detersive surfactant is alkyl benzene sulphonate that is obtained by DETAL catalyzed process, although other synthesis routes, such as HF, may also be suitable.

Suitable sulphate detersive surfactants include alkyl sulphate, such as $C_{8-18}$ alkyl sulphate, or predominantly $C_{12}$ alkyl sulphate. The alkyl sulphate may be derived from natural sources, such as coco and/or tallow. Alternative, the alkyl sulphate may be derived from synthetic sources such as $C_{12-15}$ alkyl sulphate.

Another suitable sulphate detersive surfactant is alkyl alkoxylated sulphate, such as alkyl ethoxylated sulphate, or a $C_{8-18}$ alkyl alkoxylated sulphate, or a $C_{8-18}$ alkyl ethoxylated sulphate. The alkyl alkoxylated sulphate may have an average degree of alkoxylation of from 0.5 to 20, or from 0.5 to 10. The alkyl alkoxylated sulphate may be a $C_{8-18}$ alkyl ethoxylated sulphate, typically having an average degree of ethoxylation of from 0.5 to 10, or from 0.5 to 7, or from 0.5 to 5 or from 0.5 to 3.

The alkyl sulphate, alkyl alkoxylated sulphate and alkyl benzene sulphonates may be linear or branched, substituted or un-substituted.

The anionic detersive surfactant may be a mid-chain branched anionic detersive surfactant, such as a mid-chain branched alkyl sulphate and/or a mid-chain branched alkyl benzene sulphonate. The mid-chain branches are typically $C_{1-4}$ alkyl groups, such as methyl and/or ethyl groups.

Another suitable anionic detersive surfactant is alkyl ethoxy carboxylate.

The anionic detersive surfactants are typically present in their salt form, typically being complexed with a suitable cation. Suitable counter-ions include $Na^+$ and $K^+$, substituted ammonium such as $C_1$-$C_6$ alkanolammonium such as monoethanolamine (MEA) triethanolamine (TEA), di-ethanolamine (DEA), and any mixture thereof.

Non-ionic detersive surfactant: Suitable non-ionic detersive surfactants are selected from the group consisting of: $C_8$-$C_{18}$ alkyl ethoxylates, such as, NEODOL® non-ionic surfactants from Shell; $C_6$-$C_{12}$ alkyl phenol alkoxylates wherein optionally the alkoxylate units are ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols; $C_{14}$-$C_{22}$ mid-chain branched alkyl alkoxylates, typically having an average degree of alkoxylation of from 1 to 30; alkylpolysaccharides, such as alkylpolyglycosides; polyhydroxy fatty acid amides; ether capped poly(oxyalkylated) alcohol surfactants; and mixtures thereof.

Suitable non-ionic detersive surfactants are alkyl polyglucoside and/or an alkyl alkoxylated alcohol.

Non-ionic detersive surfactant, if present, is preferably used in an amount within the range of from about 1% to about 20% by weight.

Suitable non-ionic detersive surfactants include alkyl alkoxylated alcohols, such as $C_{8-18}$ alkyl alkoxylated alcohol, or a $C_{8-18}$ alkyl ethoxylated alcohol. The alkyl alkoxylated alcohol may have an average degree of alkoxylation of from 0.5 to 50, or from 1 to 30, or from 1 to 20, or from 1 to 10. The alkyl alkoxylated alcohol may be a $C_{8-18}$ alkyl ethoxylated alcohol, typically having an average degree of ethoxylation of from 1 to 10, or from 1 to 7, or from 1 to 5, or from 3 to 7. The alkyl alkoxylated alcohol can be linear or branched, and substituted or un-substituted.

Suitable nonionic detersive surfactants include secondary alcohol-based detersive surfactants having the formula (I):

(I)

wherein $R^1$=linear or branched, substituted or unsubstituted, saturated or unsaturated $C_{2-8}$ alkyl;

wherein $R^2$=linear or branched, substituted or unsubstituted, saturated or unsaturated $C_{2-8}$ alkyl, wherein the total number of carbon atoms present in $R^1+R^2$ moieties is in the range of from 7 to 13;

wherein EO/PO are alkoxy moieties selected from ethoxy, propoxy, or mixtures thereof, optionally the EO/PO alkoxyl moieties are in random or block configuration;

wherein n is the average degree of alkoxylation and is in the range of from 4 to 10.

Other suitable non-ionic detersive surfactants include EO/PO block co-polymer surfactants, such as the Plurafac® series of surfactants available from BASF, and sugar-derived surfactants such as alkyl N-methyl glucose amide.

Suitable nonionic detersive surfactants that may be used include the primary and secondary alcohol ethoxylates, especially the $C_8$-$C_{20}$ aliphatic alcohols ethoxylated with an average of from 1 to 20 moles of ethylene oxide per mole of alcohol, and more especially the $C_{10}$-$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (e.g., glucamide).

Cationic detersive surfactant: Suitable cationic detersive surfactants include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula (II):

(II)

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, such as chloride; sulphate; and sulphonate. Suitable cationic detersive surfactants are mono-$C_{6-18}$ alkyl mono-hydroxyethyl di-methyl quaternary ammonium chlorides. Suitable cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Zwitterionic and/or amphoteric detersive surfactant: Suitable zwitterionic and/or amphoteric detersive surfactants include amine oxide such as dodecyldimethylamine N-oxide, alkanolamine sulphobetaines, coco-amidopropyl betaines, $HN^+$—R—$CO_2^-$ based surfactants, wherein R can be any bridging group, such as alkyl, alkoxy, aryl or amino acids. Many suitable detergent active compounds are available and are fully described in the literature, for example, in "Surface-Active Agents and Detergents", Volumes I and II, by Schwartz, Perry and Berch.

Chelants: Suitable chelants can also include: diethylene triamine pentaacetate, diethylene triamine penta(methyl phosphonic acid), ethylene diamine-N'N'-disuccinic acid, ethylene diamine tetraacetate, ethylene diamine tetra(methylene phosphonic acid), hydroxyethane di(methylene phosphonic acid), and any combination thereof. A suitable chelant is ethylene diamine-N'N'-disuccinic acid (EDDS) and/or hydroxyethane diphosphonic acid (HEDP). The cleaning composition may comprise ethylene diamine-N'N'-disuccinic acid or salt thereof. The ethylene diamine-N'N'-disuccinic acid may be in S,S enantiomeric form. The cleaning composition may comprise 4,5-dihydroxy-m-benzenedisulfonic acid disodium salt. Suitable chelants may also be calcium crystal growth inhibitors.

Polymers: Suitable polymers include carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in ratio of 1:4:1, hexamethylenediamine derivative polymers, and any combination thereof.

Carboxylate polymer: Suitable carboxylate polymers include maleate/acrylate random copolymer or polyacrylate homopolymer. The carboxylate polymer may be a polyacrylate homopolymer having a molecular weight of from 4,000 Da to 9,000 Da, or from 6,000 Da to 9,000 Da. Other suitable carboxylate polymers are co-polymers of maleic acid and acrylic acid, and may have a molecular weight in the range of from 4,000 Da to 90,000 Da.

Polymers: Preferably, the polymers are polyethylene glycol polymer. Suitable polyethylene glycol polymers include random graft co-polymers comprising: (i) hydrophilic backbone comprising polyethylene glycol; and (ii) hydrophobic side chain(s) selected from the group consisting of: $C_4$-$C_{25}$ alkyl group, polypropylene, polybutylene, vinyl ester of a saturated $C_1$-$C_6$ mono-carboxylic acid, $C_1$-$C_6$ alkyl ester of acrylic or methacrylic acid, and mixtures thereof. Suitable polyethylene glycol polymers have a polyethylene glycol backbone with random grafted polyvinyl acetate side chains. The average molecular weight of the polyethylene glycol backbone can be in the range of from 2,000 Da to 20,000 Da, or from 4,000 Da to 8,000 Da. The molecular weight ratio of the polyethylene glycol backbone to the polyvinyl acetate side chains can be in the range of from 1:1 to 1:5, or from 1:1.2 to 1:2. The average number of graft sites per ethylene oxide units can be less than 1, or less than 0.8, the average number of graft sites per ethylene oxide units can be in the range of from 0.5 to 0.9, or the average number of graft sites per ethylene oxide units can be in the range of from 0.1 to 0.5, or from 0.2 to 0.4. A suitable polyethylene glycol polymer is Sokalan® HP22.

Polyester soil release polymers: Suitable polyester soil release polymers have a structure as defined by one of the following structures (III), (IV) or (V):

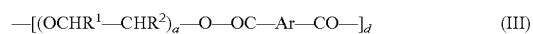  (III)

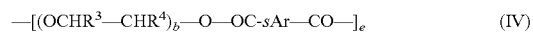  (IV)

  (V)

wherein:
a, b and c are from 1 to 200;
d, e and f are from 1 to 50;
Ar is a 1,4-substituted phenylene;
sAr is 1,3-substituted phenylene substituted in position 5 with $SO_3Me$;
Me is H, Na, Li, K, Mg/2, Ca/2, Al/3, ammonium, mono-, di-, tri-, or tetra-alkylammonium wherein the alkyl groups are $C_1$-$C_{18}$ alkyl or $C_2$-$C_{10}$ hydroxyalkyl, or any mixture thereof;
$R^1$, $R^2$, $R^3$, $R^4$, $R^5$ and $R^6$ are independently selected from H or $C_1$-$C_{18}$ n- or iso-alkyl; and $R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable polyester soil release polymers are terephthalate polymers having the structure (III) or (IV) above.

Suitable polyester soil release polymers include the Repel-O-Tex® series of polymers such as Repel-O-Tex® SF2 (Rhodia) and/or the Texcare® series of polymers such as Texcare®SRA300 (Clariant).

Other suitable soil release polymers may include, for example sulphonated and unsulphonated PET/POET polymers, both end-capped and non-end-capped, and olyethylene glycol/polyvinyl alcohol graft copolymers such as Sokalan® HP22.

Especially preferred soil release polymers are the sulphonated non-end-capped polyesters described and claimed in PCT Publication WO 95/32997A (Rhodia Chimie).

Amine polymer: Suitable amine polymers include polyethylene imine polymers, such as alkoxylated polyalkyleneimines, optionally comprising a polyethylene and/or polypropylene oxide block.

Cellulosic polymer: The cleaning composition can comprise cellulosic polymers, such as polymers selected from alkyl cellulose, alkyl alkoxyalkyl cellulose, carboxyalkyl cellulose, alkyl carboxyalkyl, and any combination thereof. Suitable cellulosic polymers are selected from carboxymethyl cellulose, methyl cellulose, methyl hydroxyethyl cellulose, methyl carboxymethyl cellulose, and mixtures thereof. The carboxymethyl cellulose can have a degree of carboxymethyl substitution from 0.5 to 0.9 and a molecular weight from 100,000 Da to 300,000 Da. Another suitable cellulosic polymer is hydrophobically modified carboxymethyl cellulose, such as Finnfix® SH-1 (CP Kelco).

Other suitable cellulosic polymers may have a degree of substitution (DS) of from 0.01 to 0.99 and a degree of blockiness (DB) such that either DS+DB is of at least 1.00 or DB+2DS−DS2 is at least 1.20. The substituted cellulosic polymer can have a degree of substitution (DS) of at least 0.55. The substituted cellulosic polymer can have a degree of blockiness (DB) of at least 0.35. The substituted cellulosic polymer can have a DS+DB, of from 1.05 to 2.00. A suitable substituted cellulosic polymer is carboxymethylcellulose.

Another suitable cellulosic polymer is cationically modified hydroxyethyl cellulose. Random graft co-polymer. Suitable random graft co-polymers typically comprise: (i) from 50 wt % to less than 98 wt % structural units derived from one or more monomers comprising carboxyl groups; (ii) from 1 wt % to less than 49 wt % structural units derived from one or more monomers comprising sulfonate moieties; and (iii) from 1 wt % to 49 wt % structural units derived from one or more types of monomers selected from ether bond-containing monomers represented by formulas (VI) and (VII).

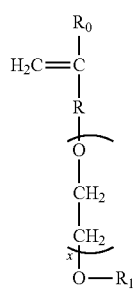

(VI)

wherein in formula (VI), $R_0$ represents a hydrogen atom or $CH_3$ group, R represents a $CH_2$ group, $CH_2CH_2$ group or single bond, X represents a number 0-5 provided X represents a number 1-5 when R is a single bond, and $R_1$ is a hydrogen atom or $C_1$ to $C_{20}$ organic group.

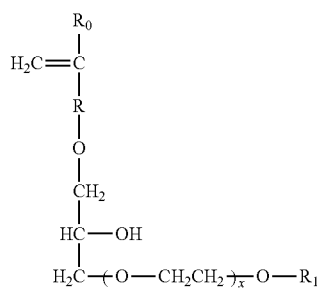

(VII)

in formula (VII), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group.

Dye transfer inhibitor polymer: Suitable dye transfer inhibitor (DTI) polymers include polyvinyl pyrrolidone (PVP), vinyl co-polymers of pyrrolidone and imidazoline (PVPVI), polyvinyl N-oxide (PVNO), and any mixture thereof.

Hexamethylenediamine derivative polymers: Suitable polymers include hexamethylenediamine derivative polymers, typically having the formula (VIII):

$$R_2(CH_3)N^+(CH_2)6N^+(CH_3)R_2.2X^-$$ (VIII)

wherein $X^-$ is a suitable counter-ion, for example chloride, and R is a poly(ethylene glycol) chain having an average degree of ethoxylation of from 20 to 30. Optionally, the poly(ethylene glycol) chains may be independently capped with sulphate and/or sulphonate groups, typically with the charge being balanced by reducing the number of $X^-$ counter-ions, or (in cases where the average degree of sulphation per molecule is greater than two), introduction of $Y^+$ counter-ions, for example sodium cations.

In another aspect, the laundry detergent comprises citrate. A suitable citrate is sodium citrate. However, citric acid may also be incorporated into the laundry detergent, which can form citrate in the wash liquor.

In another aspect, the laundry detergent comprises bleach. Alternatively, the laundry detergent may be substantially free of bleach; substantially free means "none deliberately added". Suitable bleach includes bleach activators, sources of available oxygen, pre-formed peracids, bleach catalysts, reducing bleach, and any combination thereof. If present, the bleach, or any component thereof, for example the pre-formed peracid, may be coated, such as encapsulated, or clathrated, such as with urea or cyclodextrin.

In another aspect, the laundry detergent comprises bleach activator. Suitable bleach activators include: tetraacetylethylenediamine (TAED); oxybenzene sulphonates such as nonanoyl oxybenzene sulphonate (NOBS), caprylamidononanoyl oxybenzene sulphonate (NACA-OBS), 3,5,5-trimethyl hexanoyloxybenzene sulphonate (Iso-NOBS), dodecyl oxybenzene sulphonate (LOBS), and any mixture thereof; caprolactams; pentaacetate glucose (PAG); nitrile quaternary ammonium; imide bleach activators, such as N-nonanoyl-N-methyl acetamide; and any mixture thereof.

In another aspect, the laundry detergent comprises source of available oxygen. A suitable source of available oxygen (AvOx) is a source of hydrogen peroxide, such as percarbonate salts and/or perborate salts, such as sodium percarbonate. The source of peroxygen may be at least partially coated, or even completely coated, by a coating ingredient such as a carbonate salt, a sulphate salt, a silicate salt, borosilicate, or any mixture thereof, including mixed salts thereof. Suitable percarbonate salts can be prepared by a fluid bed process or by a crystallization process. Suitable perborate salts include sodium perborate mono-hydrate (PB1), sodium perborate tetra-hydrate (PB4), and anhydrous sodium perborate which is also known as fizzing sodium perborate. Other suitable sources of AvOx include persulphate, such as oxone. Another suitable source of AvOx is hydrogen peroxide.

In another aspect, the laundry detergent comprises pre-formed peracid. A suitable pre-formed peracid is N,N-pthaloylamino peroxycaproic acid (PAP).

In another aspect, the laundry detergent comprises bleach catalyst. Suitable bleach catalysts include oxaziridinium-based bleach catalysts, transition metal bleach catalysts and bleaching enzymes.

In another aspect, the laundry detergent comprises oxaziridinium-based bleach catalyst. A suitable oxaziridinium-based bleach catalyst has the formula (IX):

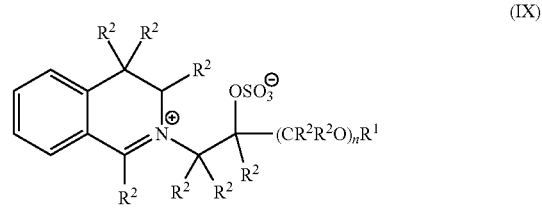

(IX)

wherein: $R^1$ is selected from the group consisting of: H, a branched alkyl group containing from 3 to 24 carbons, and a linear alkyl group containing from 1 to 24 carbons; $R^1$ can be a branched alkyl group comprising from 6 to 18 carbons, or a linear alkyl group comprising from 5 to 18 carbons, $R^1$ can be selected from the group consisting of: 2-propylheptyl, 2-butyloctyl, 2-pentylnonyl, 2-hexyldecyl, n-hexyl, n-octyl, n-decyl, n-dodecyl, n-tetradecyl, n-hexadecyl, n-octadecyl, iso-nonyl, iso-decyl, iso-tridecyl and iso-pentadecyl; $R^2$ is independently selected from the group consisting of: H, a branched alkyl group comprising from 3 to 12 carbons, and a linear alkyl group comprising from 1 to 12 carbons; optionally $R^2$ is independently selected from the group consisting of H, methyl, a branched alkyl group comprising from 3 to 12 carbons, and a linear alkyl group comprising from 1 to 12 carbons; and n is an integer from 0 to 1. Oxaziridinium-based bleach booster can be produced according to U.S. Patent Publication No. 2006/0089284A1.

In another aspect, the laundry detergent comprises transition metal bleach catalyst. The laundry detergent composition may include transition metal bleach catalyst, typically comprising copper, iron, titanium, ruthenium, tungsten, molybdenum, and/or manganese cations. Suitable transition metal bleach catalysts are manganese-based transition metal bleach catalysts.

In another aspect, the laundry detergent comprises reducing bleach. The cleaning composition may comprise a reducing bleach. However, the laundry detergent composition may be substantially free of reducing bleach; substantially free means "none deliberately added". Suitable reducing bleach include sodium sulphite and/or thiourea dioxide (TDO).

In another aspect, the laundry detergent comprises a co-bleach particle. The cleaning composition may comprise a co-bleach particle. Typically, the co-bleach particle comprises a bleach activator and a source of peroxide. It may be highly suitable for a large amount of bleach activator relative to the source of hydrogen peroxide to be present in the co-bleach particle. The weight ratio of bleach activator to source of hydrogen peroxide present in the co-bleach particle can be at least 0.3:1, or at least 0.6:1, or at least 0.7:1, or at least 0.8:1, or at least 0.9:1, or at least 1.0:1.0, or even at least 1.2:1 or higher.

The co-bleach particle can comprise: (i) bleach activator, such as TAED; and (ii) a source of hydrogen peroxide, such as sodium percarbonate. The bleach activator may at least partially, or even completely, enclose the source of hydrogen peroxide.

The co-bleach particle may comprise a binder. Suitable binders are carboxylate polymers such as polyacrylate polymers, and/or surfactants including non-ionic detersive surfactants and/or anionic detersive surfactants such as linear $C_{11}$-$C_{13}$ alkyl benzene sulphonate.

In another aspect, the laundry detergent comprises a bleach stabilizer (heavy metal sequestrant). Suitable bleach stabilizers include ethylenediamine tetraacetate (EDTA) and the polyphosphonates such as Dequest®, EDTMP.

In another aspect, the laundry detergent comprises photobleach. Suitable photobleaches are zinc and/or aluminium sulphonated phthalocyanines.

In another aspect, the laundry detergent comprises brightener. It may be preferred for the cleaning composition to comprise fluorescent brighteners such as disodium 4,4'-bis(2-sulfostyryl)biphenyl (C.I. Fluorescent Brightener 351); C.I. Fluorescent Brightener 260, or analogues with its anilino- or morpholino-groups replaced by other groups. Suitable C.I. Fluorescent Brightener 260 may have the following structure (X):

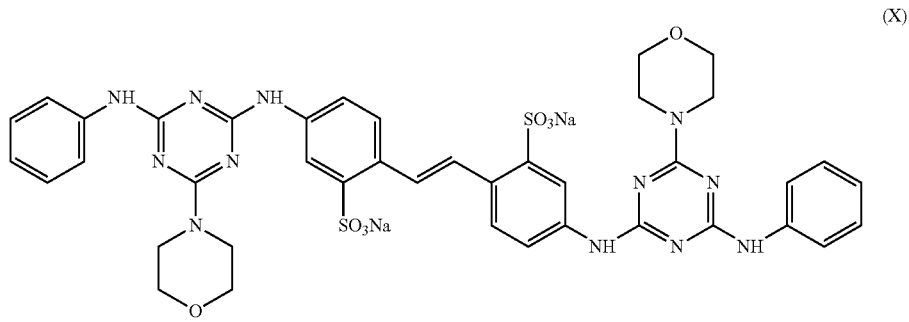

wherein the C.I. fluorescent brightener 260 is either:
predominantly in alpha-crystalline form; or
predominantly in beta-crystalline form and having a weight average primary particle size of from 3 to 30 micrometers.

In another aspect, the laundry detergent comprises bleach-stable fluorescent brighteners such as bis(sulfobenzofuranyl) biphenyl, commercially available from Ciba Specialty Chemicals as Tinopal® PLC.

In another aspect, the laundry detergent may comprise a fabric hueing agent (sometimes referred to as shading, bluing or whitening agents). Typically, the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Suitable fabric hueing agents include dyes, dye-clay conjugates, and organic and inorganic pigments. Suitable dyes include small molecule dyes and polymeric dyes. Suitable small molecule dyes include small molecule dyes selected from the group consisting of dyes falling into the Colour Index (C.I.) classifications of Direct, Basic, Reactive or hydrolysed Reactive, Solvent or Disperse dyes for example that are classified as Blue, Violet, Red, Green or Black, and provide the desired shade either alone or in combination. In another aspect, suitable small molecule dyes include small molecule dyes selected from the group consisting of Colour Index (Society of Dyers and Colourists, Bradford, UK) numbers Direct Violet dyes such as 9, 35, 48, 51, 66, and 99, Direct Blue dyes such as 1, 71, 80 and 279, Acid Red dyes such as 17, 73, 52, 88 and 150, Acid Violet dyes such as 15, 17, 24, 43, 49 and 50, Acid Blue dyes such as 15, 17, 25, 29, 40, 45, 75, 80, 83, 90 and 113, Acid Black dyes such as 1, Basic Violet dyes such as 1, 3, 4, 10 and 35, Basic Blue dyes such as 3, 16, 22, 47, 66, 75 and 159, Disperse or Solvent dyes such as those described in EP1794275 or EP1794276, or dyes as disclosed in U.S. Pat. No. 7,208,459 B2, and mixtures thereof. In another aspect, suitable small molecule dyes include small molecule dyes selected from the group consisting of C. I. numbers Acid Violet 17, Direct Blue 71, Direct Violet 51, Direct Blue 1, Acid Red 88, Acid Red 150, Acid Blue 29, Acid Blue 113 or mixtures thereof.

Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof. Polymeric dyes include those described in PCT Publications: WO2011/98355, WO2011/47987, US2012/090102, WO2010/145887, WO2006/055787 and WO2010/142503.

In another aspect, suitable polymeric dyes include polymeric dyes selected from the group consisting of fabric-substantive colorants sold under the name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® Violet CT, carboxymethyl cellulose (CMC) covalently bound to a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

Preferred hueing dyes include the whitening agents found in PCT Publications: WO 2008/87497 A1, WO2011/011799 and WO2012/054835. Preferred hueing agents for use in the present invention may be the preferred dyes disclosed in these references, including those selected from Examples 1-42 in Table 5 of PCT Publication WO2011/011799. Other preferred dyes are disclosed in U.S. Pat. No. 8,138,222. Other preferred dyes are disclosed in PCT Publication WO2009/069077.

Suitable dye clay conjugates include dye clay conjugates selected from the group comprising at least one cationic/basic dye and a smectite clay, and mixtures thereof. In another aspect, suitable dye clay conjugates include dye clay conjugates selected from the group consisting of one cationic/basic dye selected from the group consisting of C.I. Basic Yellow 1 through 108, C.I. Basic Orange 1 through 69, C.I. Basic Red 1 through 118, C.I. Basic Violet 1 through 51, C.I. Basic Blue 1 through 164, C.I. Basic Green 1 through 14, C.I. Basic Brown 1 through 23, CI Basic Black 1 through 11, and a clay selected from the group consisting of Montmorillonite clay, Hectorite clay, Saponite clay and mixtures thereof. In still another aspect, suitable dye clay conjugates include dye clay conjugates selected from the group consisting of: Montmorillonite Basic Blue B7 C.I. 42595 conjugate, Montmorillonite Basic Blue B9 C.I. 52015 conjugate, Montmorillonite Basic Violet V3 C.I. 42555 conjugate, Montmorillonite Basic Green G1 C.I. 42040 conjugate, Montmorillonite Basic Red R1 C.I. 45160 conjugate, Montmorillonite C.I. Basic Black 2 conjugate, Hectorite Basic Blue B7 C.I. 42595 conjugate, Hectorite Basic Blue B9 C.I. 52015 conjugate, Hectorite Basic Violet V3 C.I. 42555 conjugate, Hectorite Basic Green G1 C.I. 42040 conjugate, Hectorite Basic Red R1 C.I. 45160 conjugate, Hectorite C.I. Basic Black 2 conjugate, Saponite Basic Blue B7 C.I. 42595 conjugate, Saponite Basic Blue B9 C.I. 52015 conjugate, Saponite Basic Violet V3 C.I. 42555 conjugate, Saponite Basic Green G1 C.I. 42040 conjugate, Saponite Basic Red R1 C.I. 45160 conjugate, Saponite C.I. Basic Black 2 conjugate and mixtures thereof.

Suitable pigments include pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by C1-C3-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof.

In another aspect, suitable pigments include pigments selected from the group consisting of Ultramarine Blue (C.I. Pigment Blue 29), Ultramarine Violet (C.I. Pigment Violet 15) and mixtures thereof.

The aforementioned fabric hueing agents can be used in combination (any mixture of fabric hueing agents can be used).

In another aspect, the cleaning active comprises enzyme. Suitable enzymes include proteases, amylases, cellulases, lipases, xyloguncanases, pectate lyases, mannanases, bleaching enzymes, cutinases, and mixtures thereof. For the enzymes, accession numbers and IDs shown in parentheses refer to the entry numbers in the databases Genbank, EMBL and/or Swiss-Prot. For any mutations, standard 1-letter amino acid codes are used with a * representing a deletion. Accession numbers prefixed with DSM refer to micro-organisms deposited at Deutsche Sammlung von Mikroorganismen and Zellkulturen GmbH, Mascheroder Weg 1b, 38124 Brunswick (DSMZ).

Protease. The composition may comprise a protease. Suitable proteases include metalloproteases and/or serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:
  (a) subtilisins (EC 3.4.21.62), including those derived from
    *Bacillus*, such as *Bacillus lentus*, *Bacillus alkalophilus* (P27963, ELYA_BACAO), *Bacillus subtilis*, *Bacillus amyloliquefaciens* (P00782, SUBT_BACAM), *Bacillus pumilus* (P07518) and *Bacillus gibsonii* (DSM14391).

(b) trypsin-type or chymotrypsin-type proteases, such as trypsin (e.g. of porcine or bovine origin), including the *Fusarium* protease and the chymotrypsin proteases derived from *Cellumonas* (A2RQE2).

(c) metalloproteases, including those derived from *Bacillus amyloliquefaciens* (P06832, NPRE_BACAM).

Suitable proteases include those derived from *Bacillus gibsonii* or *Bacillus Lentus* such as subtilisin 309 (P29600) and/or DSM 5483 (P29599).

Suitable commercially available protease enzymes include: those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark); those sold under the tradename Maxatase®, Maxacal®, Maxapem®, Properase®, Purafect®, Purafect Prime®, Purafect Ox®, FN3®, FN4®, Excellase® and Purafect OXP® by Genencor International; those sold under the tradename Opticlean® and Optimase® by Solvay Enzymes; those available from Henkel/Kemira, namely BLAP (P29599 having the following mutations S99D+S101 R+S103A+V104I+G159S), and variants thereof including BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D) all from Henkel/Kemira; and KAP (*Bacillus alkalophilus* subtilisin with mutations A230V+S256G+S259N) from Kao.

In another aspect, suitable proteolytic enzymes (proteases) may be catalytically active protein materials which degrade or alter protein types of stains when present as in fabric stains in a hydrolysis reaction. They may be of any suitable origin, such as vegetable, animal, bacterial or yeast origin. Proteolytic enzymes or proteases of various qualities and origins and having activity in various pH ranges of from 4-12 are available. Proteases of both high and low isoelectric point are suitable.

Amylase: Suitable amylases are alpha-amylases, including those of bacterial or fungal origin. Chemically or genetically modified mutants (variants) are included. A suitable alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, sp 707, DSM 9375, DSM 12368, DSM no. 12649, KSM AP1378, KSM K36 or KSM K38. Suitable amylases include:

(a) alpha-amylase derived from *Bacillus licheniformis* (P06278, AMY_BACLI), and variants thereof, especially the variants with substitutions in one or more of the following positions: 15, 23, 105, 106, 124, 128, 133, 154, 156, 181, 188, 190, 197, 202, 208, 209, 243, 264, 304, 305, 391, 408, and 444;

(b) AA560 amylase (CBU30457, HD066534) and variants thereof, especially the variants with one or more substitutions in the following positions: 26, 30, 33, 82, 37, 106, 118, 128, 133, 149, 150, 160, 178, 182, 186, 193, 203, 214, 231, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, optionally that also contain the deletions of D183* and G184*;

(c) DSM 12649 having: (a) mutations at one or more of positions 9, 26, 149, 182, 186, 202, 257, 295, 299, 323, 339 and 345; and (b) optionally with one or more, preferably all of the substitutions and/or deletions in the following positions: 118, 183, 184, 195, 320 and 458, which if present preferably comprise R118K, DI83*, GI84*, N195F, R320K and/or R458K; and (d) variants exhibiting at least 90% identity with the wild-type enzyme from *Bacillus* SP722 (CBU30453, HD066526), especially variants with deletions in the 183 and 184 positions.

Suitable commercially available alpha-amylases are Duramyl®, Liquezyme® Termamyl®, Termamyl Ultra®, Natalase®, Supramyl®, Stainzyme®, Stainzyme Plus®, Fungamyl® and BAN® (Novozymes A/S), Bioamylase® and variants thereof (Biocon India Ltd.), Kemzym® AT 9000 (Biozym Ges. m.b.H, Austria), Rapidase®, Purastar®, Optisize HT Plus®, Enzysize®, Powerase® and Purastar Oxam®, Maxamyl® (Genencor International Inc.) and KAM® (KAO, Japan). Suitable amylases are Natalase®, Stainzyme® and Stainzyme Plus®.

Cellulase: The laundry detergent may comprise a cellulase. Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum*.

Commercially available cellulases include Celluzyme®, and Carezyme® (Novozymes A/S), Clazinase®, and Puradax HA® (Genencor International Inc.), and KAC-500(B)® (Kao Corporation).

The cellulase can include microbial-derived endoglucanases exhibiting endo-beta-1,4-glucanase activity (E.C. 3.2.1.4), including a bacterial polypeptide endogenous to a member of the genus *Bacillus* sp. AA349 and mixtures thereof. Suitable endoglucanases are sold under the tradenames Celluclean® and Whitezyme® (Novozymes A/S, Bagsvaerd, Denmark).

Suitable cellulases may also exhibit xyloglucanase activity, such as Whitezyme®.

Lipase: The composition may comprise a lipase. Suitable lipases include those of bacterial or fungal origin. Chemically modified or protein engineered mutants are included. Examples of useful lipases include lipases from *Humicola* (synonym *Thermomyces*), e.g., from *H. lanuginosa* (*T. lanuginosus*), or from *H. insolens*, a *Pseudomonas* lipase, e.g., from *P. alcaligenes* or *P. pseudoalcaligenes, P. cepacia, P. stutzeri, P. fluorescens, Pseudomonas* sp. strain SD 705, *P. wisconsinensis*, a *Bacillus* lipase, e.g., from *B. subtilis, B. stearothermophilus* or *B. pumilus*.

The lipase may be a "first cycle lipase", optionally a variant of the wild-type lipase from *Thermomyces lanuginosus* comprising T231R and N233R mutations. The wild-type sequence is the 269 amino acids (amino acids 23-291) of the Swissprot accession number Swiss-Prot 059952 (derived from *Thermomyces lanuginosus (Humicola lanuginosa)*). Suitable lipases would include those sold under the tradenames Lipex®, Lipolex® and Lipoclean® by Novozymes, Bagsvaerd, Denmark.

The laundry detergent or cleaning composition may comprise a variant of *Thermomyces lanuginosa* (O59952) lipase having >90% identity with the wild type amino acid and comprising substitution(s) at T231 and/or N233, optionally T231R and/or N233R.

Xyloglucanase: Suitable xyloglucanase enzymes may have enzymatic activity towards both xyloglucan and amorphous cellulose substrates. The enzyme may be a Glycosyl Hydrolase (GH) selected from GH families 5, 12, 44, 45 or 74. The glycosyl hydrolase selected from GH family 44 is particularly suitable. Suitable glycosyl hydrolases from GH family 44 are the XYG1006 glycosyl hydrolase from *Paenibacillus polyxyma* (ATCC 832) and variants thereof.

Also particularly suitable is the glycosyl hydrolase selected from GH family 45 having a molecular weight of from 17 kDa to 30 kDa, for example the endoglucanases sold under the tradename Biotouch® NCD, DCC and DCL (AB Enzymes, Darmstadt, Germany).

Pectate lyase: Suitable pectate lyases are either wild-types or variants of *Bacillus*-derived pectate lyases (CAF05441, AAU25568) sold under the tradenames Pectawash®, Pectaway® and X-Pect® (from Novozymes A/S, Bagsvaerd, Denmark).

Mannanase: Suitable mannanases are sold under the tradenames Mannaway® (from Novozymes A/S, Bagsvaerd, Denmark), and Purabrite® (Genencor International Inc., Palo Alto, Calif.).

Bleaching enzyme: Suitable bleach enzymes include oxidoreductases, for example oxidases such as glucose, choline or carbohydrate oxidases, oxygenases, catalases, peroxidases, like halo-, chloro-, bromo-, lignin-, glucose- or manganese-peroxidases, dioxygenases or laccases (phenoloxidases, polyphenoloxidases). Suitable commercial products are sold under the Guardzyme® and Denilite® ranges from Novozymes. It may be advantageous for additional organic compounds, especially aromatic compounds, to be incorporated with the bleaching enzyme; these compounds interact with the bleaching enzyme to enhance the activity of the oxidoreductase (enhancer) or to facilitate the electron flow (mediator) between the oxidizing enzyme and the stain typically over strongly different redox potentials.

Other suitable bleaching enzymes include perhydrolases, which catalyse the formation of peracids from an ester substrate and peroxygen source. Suitable perhydrolases include variants of the *Mycobacterium smegmatis* perhydrolase, variants of so-called CE-7 perhydrolases, and variants of wild-type subtilisin Carlsberg possessing perhydrolase activity.

Cutinase: Suitable cutinases are defined by E.C. Class 3.1.1.73, optionally displaying at least 90%, or 95%, or most optionally at least 98% identity with a wild-type derived from one of *Fusarium solani, Pseudomonas* Mendocina or *Humicola Insolens*.

Identity. The relativity between two amino acid sequences is described by the parameter "identity". For purposes of the present invention, the alignment of two amino acid sequences is determined by using the Needle program from the EMBOSS package (http://emboss.org) version 2.8.0. The Needle program implements the global alignment algorithm described in Needleman, S. B. and Wunsch, C. D. (1970) J. Mol. Biol. 48, 443-453. The substitution matrix used is BLOSUM62, gap opening penalty is 10, and gap extension penalty is 0.5.

In another aspect, the laundry detergent comprises fabric-softener. Suitable fabric-softening agents include clay, silicone and/or quaternary ammonium compounds. Suitable clays include montmorillonite clay, hectorite clay and/or laponite clay. A suitable clay is montmorillonite clay. Suitable silicones include amino-silicones and/or polydimethylsiloxane (PDMS). A suitable fabric softener is a particle comprising clay and silicone, such as a particle comprising montmorillonite clay and PDMS.

In another aspect, the laundry detergent comprises flocculant. Suitable flocculants include polyethylene oxide; for example having an average molecular weight of from 300,000 Da to 900,000 Da.

In another aspect, the laundry detergent comprises suds suppressor. Suitable suds suppressors include silicone and/or fatty acid such as stearic acid.

In another aspect, the laundry detergent comprises perfume. Suitable perfumes include perfume microcapsules, polymer assisted perfume delivery systems including Schiff base perfume/polymer complexes, starch-encapsulated perfume accords, perfume-loaded zeolites, blooming perfume accords, and any combination thereof. A suitable perfume microcapsule is melamine formaldehyde based, typically comprising perfume that is encapsulated by a shell comprising melamine formaldehyde. It may be highly suitable for such perfume microcapsules to comprise cationic and/or cationic precursor material in the shell, such as polyvinyl formamide (PVF) and/or cationically modified hydroxyethyl cellulose (catHEC).

In another aspect, the laundry detergent comprises other aesthetic. Other suitable aesthetic particles may include soap rings, lamellar aesthetic particles, geltin beads, carbonate and/or sulphate salt speckles, coloured clay particles, and any combination thereof.

Builder: Suitable builders include zeolites, phosphates, citrates, and any combination thereof.

Zeolite builder: The laundry detergent may be substantially free of zeolite builder. Substantially free of zeolite builder typically means comprises from 0 wt % to 10 wt %, zeolite builder, or to 8 wt %, or to 6 wt %, or to 4 wt %, or to 3 wt %, or to 2 wt %, or even to 1 wt % zeolite builder. Substantially free of zeolite builder preferably means "none deliberately added" zeolite builder. Typical zeolite builders include zeolite A, zeolite P, zeolite MAP, zeolite X and zeolite Y.

Phosphate builder: The laundry detergent may be substantially free of phosphate builder. Substantially free of phosphate builder typically means comprises from 0 wt % to 10 wt % phosphate builder, or to 8 wt %, or to 6 wt %, or to 4 wt %, or to 3 wt %, or to 2 wt %, or even to 1 wt % phosphate builder. Substantially free of phosphate builder preferably means "none deliberately added" phosphate builder. A typical phosphate builder is sodium tripolyphosphate (STPP), which may be used in combination with sodium orthophosphate, and/or sodium pyrophosphate.

Other inorganic builders that may be present additionally or alternatively include sodium carbonate, and/or sodium bicarbonate.

Organic builders that may be present include polycarboxylate polymers such as polyacrylates and acrylic/maleic copolymers; polyaspartates; monomeric polycarboxylates such as citrates, gluconates, oxydisuccinates, glycerol mono-di- and trisuccinates, carboxymethyloxysuccinates, carboxymethyloxymalonates, dipicolinates, hydroxyethyliminodiacetates, alkyl- and alkenylmalonates and succinates; and sulphonated fatty acid salts.

Buffer and alkalinity source: Suitable buffers and alkalinity sources include carbonate salts and/or silicate salts and/or double salts such as burkeitte.

Carbonate salt: A suitable carbonate salt is sodium carbonate and/or sodium bicarbonate. The laundry detergent may comprise bicarbonate salt. It may be suitable for the composition to comprise low levels of carbonate salt, for example, it may be suitable for the composition to comprise from 0 wt % to 10 wt % carbonate salt, or to 8 wt %, or to 6 wt %, or to 4 wt %, or to 3 wt %, or to 2 wt %, or even to 1 wt % carbonate salt. The laundry detergent may even be substantially free of carbonate salt; substantially free means "none deliberately added".

The carbonate salt may have a weight average mean particle size of from 100 to 500 micrometers. Alternatively, the carbonate salt may have a weight average mean particle size of from 10 to 25 micrometers.

Silicate salt: The laundry detergent may comprise from 0 wt % to 20 wt % silicate salt, or to 15 wt %, or to 10 wt %, or to 5 wt %, or to 4 wt %, or even to 2 wt %, and may comprise from above 0 wt %, or from 0.5 wt %, or even from 1 wt % silicate salt. The silicate can be crystalline or amorphous. Suitable crystalline silicates include crystalline layered silicate, such as SKS-6. Other suitable silicates include 1.6R silicate and/or 2.0R silicate. A suitable silicate salt is sodium silicate. Another suitable silicate salt is sodium metasilicate.

Filler: The laundry detergent may comprise from 0 wt % to 70 wt % filler. Suitable fillers include sulphate salts and/or bio-filler materials.

Sulphate salt: A suitable sulphate salt is sodium sulphate. The sulphate salt may have a weight average mean particle size of from 100 to 500 micrometers, alternatively, the sulphate salt may have a weight average mean particle size of from 10 to 45 micrometers.

Bio-filler material: A suitable bio-filler material is alkali and/or bleach treated agricultural waste.

Calcium carbonate crystal growth inhibitor: The laundry detergent may comprise a calcium carbonate crystal growth inhibitor, such as one selected from the group consisting of: 1-hydroxyethanediphosphonic acid (HEDP) and salts thereof; N,N-dicarboxymethyl-2-aminopentane-1,5-dioic acid and salts thereof; 2-phosphonobutane-1,2,4-tricarboxylic acid and salts thereof; and any combination thereof.

Antiredeposition agents, for example, cellulose esters and ethers, for example sodium carboxymethyl cellulose, may also be present.

Other ingredients that may be present include solvents, hydrotropes, such as sodium, or calcium cumene sulfonate, potassium napthalenesulfonate, or the like, fluorescers, foam boosters or foam controllers (antifoams) as appropriate, sodium carbonate, sodium bicarbonate, sodium silicate, sodium sulphate, sodium acetate, TEA-25 (polyethylene glycol ether of catylalcohol), calcium chloride, other inorganic salts, flow aids such as silicas and amorphous aluminosilicates, fabric conditioning compounds, additional clay and soil removal/anti-redeposition agents, other perfumes or properfumes, and combinations of one or more of these cleaning adjuncts.

Methods of Using the Laundry Detergent or Cleaning Composition

The compositions are typically used for cleaning and/or treating a situs inter alia a surface or fabric. As used herein, "surface" may include such surfaces such as dishes, glasses, and other cooking surfaces, hard surfaces, hair or skin. Such method includes the steps of contacting an embodiment of the laundry detergent or cleaning composition, in neat form or diluted in a wash liquor, with at least a portion of a surface or fabric, then optionally rinsing such surface or fabric. The surface or fabric may be subjected to a washing step prior to the aforementioned rinsing step. For purposes of the present invention, "washing" includes but is not limited to, scrubbing, wiping, and mechanical agitation.

The composition solution pH is chosen to be the most complimentary to a target surface to be cleaned spanning broad range of pH, from about 5 to about 11. For personal care such as skin and hair cleaning pH of such composition preferably has a pH from about 5 to about 8 for laundry cleaning compositions pH of from about 8 to about 10. The compositions are preferably employed at concentrations of from about 200 ppm to about 10,000 ppm in solution. The water temperatures preferably range from about 5° C. to about 100° C.

As will be appreciated by one skilled in the art, the laundry detergent of the present invention are ideally suited for use in laundry applications. Accordingly, the present invention includes a method for laundering a fabric. The method may comprise the steps of contacting a fabric to be laundered with a laundry detergent comprising the carboxyl group-containing polymer. The fabric may comprise most any fabric capable of being laundered in normal consumer use conditions. The solution preferably has a pH of from about 8 to about 10.5. The laundry detergent may be employed at concentrations of from about 500 ppm to about 15,000 ppm in solution, and optionally, more dilute wash conditions can be used. The water temperatures typically range from about 5° C. to about 90° C. The water to fabric ratio is typically from about 1:1 to about 30:1.

The method of laundering fabric may be carried out in a top-loading or front-loading automatic washing machine, or can be used in a hand-wash laundry application. In these applications, the wash liquor formed and concentration of laundry detergent composition in the wash liquor is that of the main wash cycle. Any input of water during any optional rinsing step(s) is not included when determining the volume of the wash liquor.

The wash liquor may comprise 40 liters or less of water, or 30 liters or less, or 20 liters or less, or 10 liters or less, or 8 liters or less, or even 6 liters or less of water. The wash liquor may comprise from above 0 to 15 liters, or from 2 liters, and to 12 liters, or even to 8 liters of water. For dilute wash conditions, the wash liquor may comprise 150 liters or less of water, 100 liters or less of water, 60 liters or less of water, or 50 liters or less of water, especially for hand washing conditions, and can depend on the number of rinses.

Typically from 0.01 Kg to 2 Kg of fabric per liter of wash liquor is dosed into the wash liquor. Typically from 0.01 Kg, or from 0.05 Kg, or from 0.07 Kg, or from 0.10 Kg, or from 0.15 Kg, or from 0.20 Kg, or from 0.25 Kg fabric per liter of wash liquor is dosed into the wash liquor.

Optionally, 50 g or less, or 45 g or less, or 40 g or less, or 35 g or less, or 30 g or less, or 25 g or less, or 20 g or less, or even 15 g or less, or even 10 g or less of the composition is contacted to water to form the wash liquor.

As will be appreciated by one skilled in the art, the cleaning compositions described above are ideally suited for use in home care (hard surface cleaning compositions) and/or dish cleaning compositions.

Test Methods

Various techniques are known in the art to determine the properties of the laundry detergents or cleaning compositions of the present invention comprising the carboxyl group-containing polymers, however, the following assays must be used in order that the invention described and claimed herein may be fully understood.

Test 1: Measurement of Weight Average Molecular Weight (Mw)

The weight average molecular weight of the polymers are determined by the technique of Gel Permeation Chromatography (GPC) under the following conditions.

Measuring device: L-7000 series (product of Hitachi Ltd.)
    Detector: HITACHI RI Detector, L-7490
    Column: SHODEX Asahipak GF-3,0-HQ, GF-7,0-HQ, GF-1G 7B (products of Showa Denko K. K.)
    Column temperature: 40° C.
    Flow velocity: 0.5 mL/min
    Calibration curve: Polyacrylic Standard (product of Sowa Kagaku Co., Ltd.)
    Eluent: 0.1 N sodium acetate/acetonitrile=3/1 (mass ratio)
    Test 2: Qualification of the Monomers and Adduct The ether bond-containing monomer, the sulfonic acid group-containing monomer, the acrylic acid-based monomer, and the hydrogen sulfite adduct are quantified by high pressure liquid chromatography (HPLC) under the following conditions.

Measuring device: L-7000 series (product of Hitachi Ltd.)
Detector: UV detector, L-7400 (product of Hitachi Ltd.)
Column: SHODEX RSpak DE-413 (product of Showa Denko K. K.)
Temperature: 40.0° C.
Eluent: 0.1% phosphoric acid aqueous solution
Flow velocity: 1.0 mU min Test 3: Measurement of Solids Content A mixture of 1.0 g of a carboxyl group-containing polymer composition of the present invention and 1.0 g of water is left in an oven heated to 130° C. in nitrogen atmosphere for one hour so as to be dried. The solids content (%) and volatile component content (%) are calculated from the mass change before and after the drying step.

Test 4: Anti-Soil Redeposition Test (under Hard Water Conditions)

This test measures the ability of the polymers to prevent soil from depositing onto the fabric. The anti-soil redeposition ability test is performed with carbon black based on the following procedure.

(1) Test fabric selected from white cotton cloth (available from Testfabric Inc.) is cut into 5 cm×5 cm samples. The degree of whiteness is determined for the white cloth samples by measuring the reflectance with a colorimetric color difference meter (SE2000, product of Nippon Denshoku Industries Co., Ltd.).

(2) Pure (ion exchanged) water is added to calcium chloride dihydrate (8.82 g) such that hard water condition (20 Kg) is prepared.

(3) A mixture (90.0 g) is prepared by adding pure (ion exchanged) water to sodium dodecylbenzensulfonate (4 g), sodium hydrogen carbonate (4.75 g), and sodium sulfate (4 g) and adjusted to pH 10 with a sodium hydroxide aqueous solution. Pure water is further added thereto such that a surfactant aqueous solution (100.0 g in total) is prepared.

(4) A tergotmeter is set at 25° C. The hard water (1 L), the surfactant aqueous solution (2.5 g), a 0.4% (based on the solids content) polymer aqueous solution (2.5 g), zeolite (0.075 g), and carbon black (0.05 g) are stirred for one minute in a pot at 100 rpm. Subsequently, seven white cloth samples are put into the mixture, and the mixture is stirred for ten minutes at 100 rpm.

(5) The white cloth samples are wrung by hand, and the hard water (1 L) at 25° C. is poured into the pot and stirred at 100 rpm for two minutes.

(6) The white cloth samples are each covered with a piece of cloth and dried by ironing while wrinkles are smoothed. The cloth samples are measured again for reflectance as whiteness with the colorimetric difference meter.

(7) The anti-soil redeposition ratio is determined from the following equation, based on the measurement results:

$$\text{Anti-Soil Redeposition Ratio (\%)} = \left(\frac{\text{Whiteness of White Cloth After Wash}}{\text{Initial Whiteness of White Cloth}}\right) \times 100\%$$

Test 5: Compatibility with Surfactant Test

Laundry detergents each comprising the carboxyl group-containing polymer are prepared using the following materials:

SFT-70H (polyoxyethylene alkyl ether, product of NIPPON SHOKUBAI Co., Ltd.): 40 g NEOPELEX F-65 (sodium dodecylbenzene sulfonate, product of Kao Corp.): 7.7 g (active ingredient: 5 g)
Kohtamin 86W (stearyl trimethylammonium chloride, product of Kao Corp.): 17.9 g (active ingredient: 5 g)
Diethanolamine: 5 g
Ethanol: 5 g
Propylene glycol: 5 g
Test sample: 1.5 g (based on solids content)
Ion exchange water: balance to provide 100 g of detergent composition.

(1) The mixture is sufficiently stirred so that all the components are uniformly dispersed. Turbidity (kaolin turbidity, mg/L) of the mixture is evaluated by turbidity measured at 25° C. with a turbidimeter ("NDH2000", product of Nippon Denshoku Co., Ltd.).

(2) Evaluation of the results is based on the following criteria:
Good: Kaolin turbidity of not less than 0 and less than 50 mg/L; phase separation, sedimentation, and turbidity are not visually observed.
Intermediate: Kaolin turbidity of not less than 50 mg/L and less than 200 mg/L; slight turbidity is visually observed.
Bad: Kaolin turbidity of not less than 200 mg L; turbidity is visually observed.

Test 6: Whiteness Maintenance Assay

This test is intended to measure the ability of the laundry detergent to prevent loss in whiteness (i.e., whiteness maintenance) of fabrics. Whiteness maintenance of fabrics is evaluated by image analysis after single or multi-cycle washes. Typically, "whiteness" can be reported by its whiteness index, which is conveniently converted from CIELAB (an internationally recognized color scale system developed by CIE ("Commission Internationale de l'Eclairage")). CIE color scale for whiteness is the most commonly used whiteness index and refers to measurements made under D65 illumination, which is the standard representation of outdoor daylight. In technical terms, whiteness is a single number index referencing the relative degree of whiteness (of near-white materials under specific lighting conditions), and the higher the number, the whiter the material. As an example, for a perfect reflecting, non-fluorescent white material, the CIE whiteness index ($L^*$) would be 100.

The steps for assaying the whiteness maintenance of the laundry detergent of the present invention are as follows:

(1) Dissolve 1.1 g of laundry detergent raw materials in 600 g of triple filtered (0.1 micron Millipore membrane filter is used with a vacuum Buchner filtering apparatus) deionized water according to the concentrations as provided in Table 1 herein.

TABLE 1

| | Wash Solution | |
|---|---|---|
| Detergent Material | Concentration (ppm) | Supplier |
| $C_{11.8}$ Alkylbenzene sulfonate | 271 | Huntsman |
| $C_{12-15}$ Alkylethoxy(3) sulfate | 40 | Huntsman |
| $C_{14-15}$ Alkyl-7-ethoxylate | 18 | Shell |
| Hydroxyethane diphosphonic acid | 4.8 | Excel Industries Limited |

TABLE 1-continued

Wash Solution

| Detergent Material | Concentration (ppm) | Supplier |
|---|---|---|
| Sokalan ® 101 polymer | 9.25 | BASF |
| Sodium Carbonate | 273 | Sigma Aldrich |
| Sodium Sulfate | 982 | Sigma Aldrich |
| NaOH | pH adjust to 10.3 | EMD Chemicals |

(2) Transfer 14 mL of the wash solution into 20 mL glass vials. The wash solution is then mixed with a polymer of the invention or a comparative polymer to make a "modified" laundry detergent wash solution. For each polymer or comparative polymer being assayed, prepare two glass vials and add 14 µl and 56 µl of 1% solution. Add Teflon coated magnets for additional agitation.

(3) Add 28 µl of 1% stock hardness solution to the wash solution. A 1% solution of water hardness is prepared according to the following procedure.

(4) A 1% solution of water hardness is prepared according to the following procedure. Into a 1 L beaker, add 168.09 g $CaCl_2 \cdot 2H_2O$ and 116.22 g $MgCl_2 \cdot 6H_2O$. Add 800 mL of de-ionized water. Using a stir bar and stirring plate, stir the solution until the mixture is dissolved and the solution turns clear. Pour the solution into a 1 L volumetric flask and fill to 1 L line. Add a stirring bar into flask and stir again for ~5 minutes. Remove the stir bar and refill with de-ionized water to the 1 L line. Store the solution in a plastic bottle until ready to use.

(5) Add 6.1 µL of an artificial body soil to wash solution in the 20 mL glass vials. The artificial body soil composition is prepared according to Table 2.

TABLE 2

Artificial Body Soil Composition

| Ingredients | wt % | Supplier |
|---|---|---|
| Palm Kernel Fatty Acid | 15 | Peter Cremer/ RMS 25956 |
| Oleic Acid | 15 | Ch. Store/ Riedel-de Haen |
| Paraffin Oil | 15 | Ch. Store/ Uvasol |
| Olive Oil | 15 | GB |
| Soja Oil | 15 | GB |
| Squalene | 5 | FLUKA |
| Cholesterol 95% | 5 | ALDRICH |
| Myristic Acid 95% | 5 | ALDRICH |
| Palmitic Acid 95% | 5 | SIGMA |
| Stearic Acid 90%+ | 5 | SIGMA |

(6) Test fabrics are selected from 1.5 cm diameter polyester fabrics (PW19) and/or 1.5 cm diameter cotton fabrics (CW120) purchased from Empirical Manufacturing Company (Blue Ash, Cincinnati). Add nine of the polyester fabrics and nine cotton fabrics to 20 mL glass vial wash solution. Secure 20 mL wash vial tightly to Wrist Action Shaker Model 75 (Burrell Scientific, Pittsburgh, Pa.). Use a timer and run the wash for 30 minutes. At the end of the wash empty the contents of the glass vial wash solution on a Buchner funnel. Transfer the test fabric disks to another 20 mL vial and add 14 mL of rinse solution.

(7) To prepare the rinse solution, add 28 µL of 1% hardness solution to 14 mL of de-ionized filtered water. Secure vial to Wrist Action Shaker and rinse for 3 minutes. At the end of the rinse remove from Wrist Action Shaker and place the test fabrics on black plastic board template. Let air dry for at least two hours. For multi-cycle washes, just repeat the above steps.

(8) For each test fabric, two whiteness index measurements from before (i.e., initial) and after the wash cycle (i.e., treated) are taken using the CIELab color parameters with a Datacolor spectrometer. The relative whiteness index (i.e., whiteness loss) between the initial unwashed fabric and final washed fabric is reported.

(9) A delta W (i.e., ΔW), representing the difference in the whiteness index measurements between the initial and treated, is calculated for each fabric tested, and represented by the following calculation:

ΔW=Initial Whiteness Index−Treated Whiteness Index.

Typically, ΔW is a negative value as whiteness tends to decrease after washing.

(10) Additionally, a percent Whiteness Maintenance Effect (i.e., % WME) is determined using the following calculation:

$$\% \, WME = \left( \frac{[\Delta W_{Pi} + \Delta W_{Pr}]}{-(\Delta W_{Pr})} \right) \times 100\%$$

wherein:
$\Delta W_{Pi}$=ΔW for the polymer of interest
$\Delta W_{pr}$=ΔW for the reference polymer (e.g., Comparative Polymers 1 or 2)
% WME represents a laundry detergent's, particularly the polymer's, ability for preventing whiteness loss of a fabric after washing. Whiteness maintenance performance improves with higher % WME.

EXAMPLES

Hereinafter, the present invention is described in more detail based on examples. All parts are by weight unless otherwise specified, and all percentages are by mass unless otherwise specified.

Example 1

Synthesis of the Carboxyl Group-Containing Polymers

The following carboxyl group-containing polymers in Table 3, were prepared by the methods disclosed herein, but can be synthesized by other methods known to one skilled in the art. Therefore, the following synthetic Examples serve to illustrate the methods used to synthesize the polymers and are not intended to limit the scope of the invention.

TABLE 3

Properties of Synthesized Carboxyl Group-Containing Polymers

| Polymer | Structure Unit (a) Mass % | Structure Unit (b) Mass % | Structure Unit (c) Mass % | Weight Average Molecular Weight (g/mol) |
|---|---|---|---|---|
| 1 | 5% | 23% | 72% | 35,000 |
| 2 | 15% | 13% | 72% | 37,000 |
| 3 | 10% | 18% | 72% | 46,000 |
| 4 | 5% | 15% | 80% | 35,000 |

TABLE 3-continued

Properties of Synthesized Carboxyl Group-Containing Polymers

| Polymer | Structure Unit (a) Mass % | Structure Unit (b) Mass % | Structure Unit (c) Mass % | Weight Average Molecular Weight (g/mol) |
|---|---|---|---|---|
| 5 | 5% | 5% | 90% | 37,000 |
| 6 | 5% | 15% | 80% | 47,000 |
| 7 | 5% | 15% | 80% | 39,000 |
| 8 | 5% | 15% | 80% | 32,000 |
| 9 | 5% | 15% | 80% | 25,000 |
| 10 | 8% | 8% | 84% | 46,000 |
| 11 | 5% | 23% | 72% | 43,000 |
| 12 | 9% | 12% | 79% | 22,000 |
| 13 | 3% | 17% | 80% | 34,000 |
| 14 | 5% | 23% | 72% | 28,000 |
| 15 | 5% | 23% | 72% | 58,000 |

Example 1A

Synthesis of Polymer 1

(1) Synthesis of the Monomers

In a 500 mL four-necked glass flask equipped with a reflux condenser and a stirrer (paddle blade), n-butylalcohol (370.0 g) and sodium hydroxide pellets (4.27 g) were stirred while heating to 60° C. Next, allyl glycidyl ether (hereinafter, referred to as "AGE") (57.0 g) was added thereto over 30 minutes, and then the mixture was reacted for five hours. The resulting solution was transferred to a 1000 mL recovery flask, and the solvent therein was removed by a rotary evaporator. To the residue was added a 20% by mass sodium chloride aqueous solution (200.0 g), and the resulting aqueous solution was transferred to a 500 mL separating funnel. The solution was shaken enough and then left standing until the solution was separated into phases. The lower phase was removed and the upper phase was transferred into a 300 mL recovery flask to remove the solvent therein by a rotary evaporator. The precipitated salt was removed by filtration, and thus a polymer (1) was obtained.

(2) Polymerization

In a 1000 mL glass separable flask equipped with a reflux condenser and a stirrer (paddle blade), pure water (128.4 g) and Mohr's salt (0.0187 g) were stirred while heating to 85° C. Thus, a polymerization reaction system was built. Next, an 80% acrylic acid aqueous solution (hereinafter, also referred to as 80% AA)(270.0 g), a 40% aqueous solution of sodium 3-allyloxy-2-hydroxypropanesulfonate (hereinafter, also referred to as 40% HAPS)(192.0 g), the monomer (1) (15.0 g), a 15% sodium persulfate aqueous solution (hereinafter, also referred to as 15% NaPS)(68.7 g), and a 35% sodium hydrogen sulfite aqueous solution (hereinafter, also referred to as 35% SBS)(19.6 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 120 minutes, 120 minutes, 190 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise a 48% sodium hydroxide aqueous solution (hereinafter, also referred to as 48% NaOH) (193.3 g).

Through these steps, a polymer aqueous solution (1) containing a polymer (1) of the present invention was prepared. The solids content of the polymer aqueous solution (1) was 45%, and the weight average molecular weight of the polymer (1) was 35,000. Polymer (1) comprises 5% by mass of structure (a), 23% by mass of unit (b), and 72% by mass of unit (c).

Example 1B

Synthesis of Polymer 2

(1) Synthesis of Monomers

In a 2 L four-necked glass flask equipped with a reflux condenser and a stirrer (paddle blade), pure water (491.0 g) and di-n-butylamine (258.0 g) were stirred under purging with nitrogen while the liquid temperature was controlled to 50° C. Subsequently, AGE (232.8 g) was gradually added drop-wise thereto over two hours with stirring. The liquid temperature was maintained at 50° C. to 60° C. After the completion of drop-wise addition, the resulting mixture was matured for two hours while the liquid temperature was maintained at 60° C.

After cooled to room temperature, the liquid was transferred to a separating funnel and left standing. As a result, the liquid was separated into two phases. The lower aqueous phase was removed. The upper phase was washed with pure water. The resulting liquid was transferred to a recovery flask, and water therein was completely removed by a rotary evaporator. In this manner, a monomer (2) was obtained.

(2) Polymerization

In a 1000 mL glass separable flask equipped with a reflux condenser and a stirrer (paddle blade), pure water (128.6 g) and Mohr's salt (0.0186 g) were stirred while heating to 85° C. Thus, a polymerization reaction system was built. Next, 80% AA (270.0 g), 40% HAPS (192.0 g), the monomer (2) (15.0 g), 15% NaPS (68.3 g), and 35% SBS (14.6 g) were separately added drop-wise through different nozzles to the polymerization reaction system maintained at 85° C., with stirring. The drop-wise addition times of 80% AA, 40% HAPS, the monomer (2), 15% NaPS, and 35% SBS were 180 minutes, 150 minutes, 120 minutes, 190 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (193.3 g).

Through these steps, a polymer aqueous solution (2) containing a polymer (2) of the present invention was prepared. The solids content of the polymer aqueous solution (2) was 45%, and the weight average molecular weight of the polymer (2) was 37,000. Polymer (2) comprises 15% by mass of structure (a), 13% by mass of unit (b), and 72% by mass of unit (c).

Example 1C

Synthesis of Polymer 3

In a 1000 mL glass separable flask equipped with a reflux condenser and a stirrer (paddle blade), pure water (146.8 g) and Mohr's salt (0.0186 g) were stirred while heating to 85°

C. Thus, a polymerization reaction system was built. Next, 80% AA (270.0 g), 40% HAPS (150.2 g), the monomer (1) (30.0 g), 15% NaPS (68.7 g), and 35% SBS (19.6 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 130 minutes, 140 minutes, 190 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (197.5 g).

Through these steps, a polymer aqueous solution (3) containing a polymer (3) of the present invention was prepared. The solids content of the polymer aqueous solution (3) was 45%, and the weight average molecular weight of the polymer (3) was 46,000. Polymer (3) comprises 10% by mass of structure (a), 18% by mass of unit (b), and 72% by mass of unit (c).

Example 1D

Synthesis of Polymer 4

In a 2000 mL glass separable flask equipped with a reflux condenser and a stirrer (paddle blade), pure water (184.1 g) and Mohr's salt (0.0252 g) were stirred while heating to 85° C. Thus, a polymerization reaction system was built. Next, 80% AA (400.0 g), 40% HAPS (166.9 g), the monomer (1) (20.0 g), 15% NaPS (102.4 g), and 35% SBS (22.2 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 120 minutes, 150 minutes, 200 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (298.2 g).

Through these steps, a polymer aqueous solution (4) containing a polymer (4) of the present invention was prepared. The solids content of the polymer aqueous solution (4) was 45%, and the weight average molecular weight of the polymer (4) was 35,000. Polymer (4) comprises 5% by mass of structure (a), 15% by mass of unit (b), and 80% by mass of unit (c).

Example 1E

Synthesis of Polymer 5

In a 2000 mL glass separable flask equipped with a reflux condenser and a stirrer (paddle blade), pure water (222.5 g) and Mohr's salt (0.0249 g) were stirred while heating to 85° C. Thus, a polymerization reaction system was built. Next, 80% AA (450.0 g), 40% HAPS (55.6 g), the monomer (1) (20.0 g), 15% NaPS (111.1 g), and 35% SBS (22.3 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 150 minutes, 150 minutes, 200 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (298.2 g).

Through these steps, a polymer aqueous solution (5) containing a polymer (5) of the present invention was prepared. The solids content of the polymer aqueous solution (5) was 45%, and the weight average molecular weight of the polymer (5) was 37,000. Polymer (5) comprises 5% by mass of structure (a), 5% by mass of unit (b), and 90% by mass of unit (c).

Example 1F

Synthesis of Polymer 6

In a 2000 mL glass separable flask equipped with a reflux condenser and a stirrer (paddle blade), pure water (184.1 g) and Mohr's salt (0.0251 g) were stirred while heating to 85° C. Thus, a polymerization reaction system was built. Next, 80% AA (400.0 g), 40% HAPS (166.9 g), the monomer (1) (20.0 g), 15% NaPS (102.4 g), and 35% SBS (18.0 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 120 minutes, 150 minutes, 200 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (298.2 g).

Through these steps, a polymer aqueous solution (6) containing a polymer (6) of the present invention was prepared. The solids content of the polymer aqueous solution (6) was 45%, and the weight average molecular weight of the polymer (6) was 47,000. Polymer (6) comprises 5% by mass of structure (a), 15% by mass of unit (b), and 80% by mass of unit (c).

Example 1G

Synthesis of Polymer 7

In a 2000 mL glass separable flask equipped with a reflux condenser and a stirrer (paddle blade), pure water (187.8 g) and Mohr's salt (0.0251 g) were stirred while heating to 85° C. Thus, a polymerization reaction system was built. Next, 80% AA (400.0 g), 40% HAPS (166.9 g), the monomer (1) (20.0 g), 15% NaPS (97.2 g), and 35% SBS (20.8 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 120 minutes, 150 minutes, 190 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed.

After the completion of polymerization, the polymerization reaction solution was cooled with stirring, and then neutralized by gradually adding drop-wise 48% NaOH (298.2 g).

Through these steps, a polymer aqueous solution (7) containing a polymer (7) of the present invention was prepared. The solids content of the polymer aqueous solution (7) was 45%, and the weight average molecular weight of the polymer (7) was 39,000. Polymer (7) comprises 5% by mass of structure (a), 15% by mass of unit (b), and 80% by mass of unit (c).

Example 1H

Synthesis of Polymer 8

In a 2000 mL glass separable flask equipped with a reflux condenser and a stirrer (paddle blade), pure water (187.8 g) and Mohr's salt (0.0252 g) were stirred while heating to 85° C. Thus, a polymerization reaction system was built. Next, 80% AA (400.0 g), 40% HAPS (166.9 g), the monomer (1) (20.0 g), 15% NaPS (97.2 g), and 35% SBS (23.6 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 120 minutes, 150 minutes, 190 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (298.2 g).

Through these steps, a polymer aqueous solution (8) containing a polymer (8) of the present invention was prepared. The solids content of the polymer aqueous solution (8) was 45%, and the weight average molecular weight of the polymer (8) was 32,000. Polymer (8) comprises 5% by mass of structure (a), 15% by mass of unit (b), and 80% by mass of unit (c).

Example 1I

Synthesis of Polymer 9

In a 2000 mL glass separable flask equipped with a reflux condenser and a stirrer (paddle blade), pure water (182.6 g) and Mohr's salt (0.0253 g) were stirred while heating to 85° C. Thus, a polymerization reaction system was built. Next, 80% AA (400.0 g), 40% HAPS (166.9 g), the monomer (1) (20.0 g), 15% NaPS (102.4 g), and 35% SBS (30.5 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 120 minutes, 150 minutes, 200 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (298.2 g).

Through these steps, a polymer aqueous solution (9) containing a polymer (9) of the present invention was prepared. The solids content of the polymer aqueous solution (9) was 45%, and the weight average molecular weight of the polymer (9) was 25,000. Polymer (9) comprises 5% by mass of structure (a), 15% by mass of unit (b), and 80% by mass of unit (c).

Example 1J

Synthesis of Polymer 10

In a 2000 mL glass separable flask equipped with a reflux condenser and a stirrer (paddle blade), pure water (295.5 g) and Mohr's salt (0.0354 g) were stirred while heating to 85° C. Thus, a polymerization reaction system was built. Next, 80% AA (590.6 g), 40% HAPS (125.2 g), the monomer (1) (45.0 g), 15% NaPS (140.7 g), and 35% SBS (30.1 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 150 minutes, 150 minutes, 200 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (452.3 g).

Through these steps, a polymer aqueous solution (10) containing a polymer (10) of the present invention was prepared. The solids content of the polymer aqueous solution (10) was 45%, and the weight average molecular weight of the polymer (10) was 46,000. Polymer (10) comprises 8% by mass of structure (a), 8% by mass of unit (b), and 84% by mass of unit (c).

Example 1K

Synthesis of Polymer 11

In a 2000 mL glass separable flask equipped with a reflux condenser and a stirrer (paddle blade), pure water (250.4 g) and Mohr's salt (0.0360 g) were stirred while heating to 85° C. Thus, a polymerization reaction system was built. Next, 80% AA (522.0 g), 40% HAPS (371.1 g), the monomer (1) (29.0 g), 15% NaPS (132.8 g), and 35% SBS (26.6 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 120 minutes, 150 minutes, 190 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (373.8 g).

Through these steps, a polymer aqueous solution (11) containing a polymer (11) of the present invention was prepared. The solids content of the polymer aqueous solution (11) was 45%, and the weight average molecular weight of the polymer (11) was 43,000. Polymer (11) comprises 5% by mass of structure (a), 23% by mass of unit (b), and 72% by mass of unit (c).

Example 1L

Synthesis of Polymer 12

In a 2000 mL glass separable flask equipped with a reflux condenser and a stirrer (paddle blade), pure water (280.4 g) and Mohr's salt (0.0352 g) were stirred while heating to 85° C. Thus, a polymerization reaction system was built. Next, 80% AA (548.6 g), 40% HAPS (185.5 g), the monomer (1) (50.0 g), 15% NaPS (134.1 g), and 35% SBS (55.5 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 150 minutes, 150 minutes, 200 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (413.3 g).

Through these steps, a polymer aqueous solution (12) containing a polymer (12) of the present invention was prepared. The solids content of the polymer aqueous solution (12) was 45%, and the weight average molecular weight of the polymer (12) was 22,000. Polymer (12) comprises 9% by mass of structure (a), 12% by mass of unit (b), and 79% by mass of unit (c).

Example 1M

Synthesis of Polymer 13

In a 2000 mL glass separable flask equipped with a reflux condenser and a stirrer (paddle blade), pure water (252.1 g) and Mohr's salt (0.0356 g) were stirred while heating to 85° C. Thus, a polymerization reaction system was built. Next, 80% AA (566.7 g), 40% HAPS (268.0 g), the monomer (1) (17.0 g), 15% NaPS (137.6 g), and 35% SBS (29.5 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 120 minutes, 150 minutes, 200 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (419.2 g).

Through these steps, a polymer aqueous solution (13) containing a polymer (13) of the present invention was prepared. The solids content of the polymer aqueous solution (13) was 45%, and the weight average molecular weight of the polymer (13) was 34,000. Polymer (13) comprises 3% by mass of structure (a), 17% by mass of unit (b), and 80% by mass of unit (c).

Example 1N

Synthesis of Polymer 14

In a 2000 mL glass separable flask equipped with a reflux condenser and a stirrer paddle blade), pure water (101.9 g) and Mohr's salt (0.0222 g) were stirred while heating to 85° C. Thus, a polymerization reaction system was built. Next, 80% AA (332.5 g), 40% HAPS (237.5 g), the monomer (1) (19.0 g), 15% NaPS (85.6 g), and 35% SBS (30.6 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 150 minutes, 120 minutes, 190 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (247.9 g).

Through these steps, a polymer aqueous solution (14) containing a polymer (14) of the present invention was prepared. The solids content of the polymer aqueous solution (14) was 45%, and the weight average molecular weight of the polymer (14) was 28,000. Polymer (14) comprises 5% by mass of structure (a), 15 23% by mass of unit (b), and 80 72% by mass of unit (c).

Example 1O

Synthesis of Polymer 15

In a 2000 mL glass separable flask equipped with a reflux condenser and a stirrer (paddle blade), pure water (130.2 g) and Mohr's salt (0.0185 g) were stirred while heating to 85° C. Thus, a polymerization reaction system was built. Next, 80% AA (270.0 g), 40% HAPS (192.0 g), the monomer (1) (15.0 g), 15% NaPS (68.7 g), and 35% SBS (9.8 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 120 minutes, 150 minutes, 190 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (193.3 g).

Through these steps, a polymer aqueous solution (15) containing a polymer (15) of the present invention was prepared. The solids content of the polymer aqueous solution (15) was 45%, and the weight average molecular weight of the polymer (15) was 58,000. Polymer (15) comprises 5% by mass of structure (a), 23% by mass of unit (b), and 72% by mass of unit (c).

Example 2

Synthesis of the Comparative Polymers

The following comparative polymers in Table 4 were prepared by the methods disclosed herein, but can be synthesized by other methods known to one skilled in the art. Therefore, the following synthetic Examples serve to illustrate the methods used to synthesize the polymers and are not intended to limit the scope of the invention.

TABLE 4

Properties of Synthesized Comparative Polymers

| Comparative Polymer | Structure Unit (a) Mass % | Structure Unit (b) Mass % | Structure Unit (c) Mass % | Weight Average Molecular Weight (g/mol) |
|---|---|---|---|---|
| 1 | 5% | 23% | 72% | 17,000 |
| 2 | 5% | 23% | 72% | 8,200 |

Example 2A

Synthesis of Comparative Polymer 1

In a 2000-mL glass separable flask equipped with a reflux condenser and a stirrer (paddle blade), pure water (125.7 g) and Mohr's salt (0.0190 g) were stirred while heating to 85° C. Thus, a polymerization reaction system was built. Next, 80% AA (270.0 g), 40% HAPS (192.0 g), the monomer (1) (15.0 g), 15% NaPS (68.7 g), and 35% SBS (34.3 g) were separately added dropwise through different nozzles to the polymerization reaction system maintained at 85° C., with stirring. The drop-wise addition times of 80% AA, 40% HAPS, the monomer (1), 15% NaPS, and 35% SBS were 180 minutes, 120 minutes, 150 minutes, 190 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (193.3 g).

Through these steps, a comparative polymer aqueous solution (2) containing a comparative polymer (2) was prepared. The solids content of the comparative polymer aqueous solution (2) was 45%, and the weight average molecular weight of the comparative polymer (2) was 17,000. Comparative polymer (2) comprises 5% by mass of structure (a), 23% by mass of unit (b), and 72% by mass of unit (c).

Example 2B

Synthesis of Comparative Polymer 2

Comparative Polymer 4 ("CP4") can be prepared by the methods disclosed in PCT Publication WO2010/04468, by methods disclosed herein, or by methods known to one skilled in the art. Alternatively, CP4 can be prepared as follows.

In a 1000 mL glass separable flask equipped with a reflux condenser and a stirrer (paddle blade), pure water (121.1 g) and Mohr's salt (0.0194 g) were stirred while heating to 85° C. Thus, a polymerization reaction system was built. Next, 80% AA (270.0 g), 40% HAPS (192.0 g), the monomer (1) (15.0 g), 15% NaPS (68.7 g), and 35% SBS (58.9 g) were separately added drop-wise through different nozzles to the polymerization reaction system maintained at 85° C., with stirring. The drop-wise addition times of 80% AA, 40% HAPS, the monomer (1), 15% NaPS, and 35% SBS were 180 minutes, 120 minutes, 150 minutes, 190 minutes, and 175 minutes, respectively. The drop-wise addition of each solution was continuously performed at a constant rate.

The reaction solution was maintained (matured) at 85° C. for 30 minutes after the completion of drop-wise addition of 80% AA. In this manner, polymerization was completed. After the completion of polymerization, the polymerization reaction solution was cooled with stirring, and then neutralized by gradually adding drop-wise 48% NaOH (193.3 g).

Through these steps, a comparative polymer aqueous solution (2) containing a comparative polymer (2) was prepared. The solids content of the comparative polymer aqueous solution (2) was 45%; the weight average molecular weight of the comparative polymer (2) was 8,200; and the anti-soil redeposition ability according to the test method above of the comparative polymer (2) was 32.6%. Comparative polymer (2) comprises 5% by mass of structure (a), 23% by mass of unit (b), and 72% by mass of unit (c).

Example 3

Results from Anti-Soil Redeposition Assay

The anti-soil redeposition ratio (i.e., ability) of select examples of the carboxyl group-containing polymers of the present invention and comparative polymers were assayed in the method as described in the Test Method section. The results are provided in Table 5 herein. For each of the polymers and comparative polymers, the mass ratio (% by mass) between the structure units (a), (b), and (c); the 3-sulfopropionic acid (3SPA) contents (ppm); and the weight average molecular weight (g/mol), are provided in Table 5. Further, "OBu" and "OBu$_2$", as used in Table 5, refer to a n-butyl alcohol group in which a hydrogen atom of n-butyl alcohol is removed and a di-n-butylamine group in which a hydrogen atom of di-n-butylamine is removed, respectively.

Results:

The results demonstrated that the carboxyl group-containing polymers including a structure unit (a) derived from an ether bond-containing monomer (A), a structure unit (b) derived from a sulfonic acid group-containing monomer (B), and a structure unit (c) derived from an acrylic acid-based monomer (C) at specific levels, and having a specific weight average molecular weight, and the compositions comprising these carboxyl group-containing polymers, and preferably with a specific amount of an adduct of a hydrogen sulfite to the acrylic acid-based monomer (C) have high anti-soil redeposition ability, particularly in elevated hard water wash conditions. Further, the difference in the anti-soil redeposition ability between the carboxyl group-containing polymers of the present invention was much higher than for the Comparative Polymer 1 (M.W. 17,000) and suggest that the carboxyl group-containing polymers, when formulated into the laundry detergent of the present invention, will have the requisite enhanced level of performance of preventing soil components from reattaching to fabric that is needed with the higher hardness water conditions. Additionally, without intending to be limited by theory, it is believed that the anti-soil redeposition ratio is a good and reproducible predictor of the overall whiteness maintenance properties of the polymer when it is added into a laundry detergent composition according to the present invention.

TABLE 5

Anti-Soil Redeposition Ratio of Selected Examples

| Polymer or Comparative Polymer | Monomer (A) | Structure units (a)/(b)/(c) (% by mass) | Weight Average Molecular Weight (g/mol) | 3SPA (ppm) | Anti-Soil Redeposition Ratio (%) |
|---|---|---|---|---|---|
| Polymer 1 | AGE-OBu | 5/23/72 | 35,000 | 4,000 | 38.6% |
| Polymer 2 | AGE-OBu$_2$ | 5/23/72 | 35,000 | 4,000 | 45.0% |

TABLE 5-continued

Anti-Soil Redeposition Ratio of Selected Examples

| Polymer or Comparative Polymer | Monomer (A) | Structure units (a)/(b)/(c) (% by mass) | Weight Average Molecular Weight (g/mol) | 3SPA (ppm) | Anti-Soil Redeposition Ratio (%) |
|---|---|---|---|---|---|
| Polymer 3 | AGE-OBu | 10/18/72 | 46,000 | 3,000 | 37.8% |
| Polymer 4 | AGE-OBu | 5/15/80 | 35,000 | 200 | 37.7% |
| Polymer 15 | AGE-OBu | 5/23/72 | 58,000 | 2,000 | 36.5% |
| Comparative Polymer 1 | AGE-OBu | 5/23/72 | 17,000 | 5,000 | 32.9% |

Example 4

Whiteness Maintenance of Selected Examples

The whiteness maintenance performance of the carboxyl group-containing polymers of the present invention and comparative polymers in sample laundry detergent formulations were assayed in the method as described in the Whiteness Maintenance Assay as described herein. The purpose of this test is to demonstrate the improved whiteness maintenance performance of the carboxyl group-containing polymers of the present invention. In particular, the inventors identified representative polymers from PCT Publication WO2010/04468, which are disclosed herein as Comparative Polymers 1 and 2 (also referred to as "CP1" and "CP2", respectively).

CP1 is a carboxylic group-containing polymer having a weight average molecular weight of 17,000 and a molar ratio of 5% by mass of an ether bond-containing monomer, 23% by mass of sulfonic acid-based monomer, and 72% by mass of an acrylic acid-based monomer. While CP2 is a carboxylic group-containing polymer having a weight average molecular weight of 8,200, and a molar ratio of 5% by mass of an ether bond-containing monomer, 23% by mass of sulfonic acid-based monomer, and 72% by mass of an acrylic acid-based monomer.

Accordingly, due to their lower weight average molecular weight, Comparative Polymers 1 and 2 are outside of the claimed weight average molecular weight range of from about 20,000 to about 60,000. See Table 6 for a full list of the polymers and comparative polymers selected for evaluation.

TABLE 6

Polymers and Comparative Polymers Selected for Whiteness Evaluation

| Polymer or Comparative Polymer | Structure units (a)/(b)/(c) (% by mass) | Weight Avg. M.W. (g/mol) |
|---|---|---|
| Polymer 1 | 5/23/72 | 35,000 |
| Polymer 4 | 5/15/80 | 39,000 |
| Polymer 15 | 5/23/72 | 58,000 |
| Comparative Polymer 1 ("CP1") | 5/23/72 | 17,000 |
| Comparative Polymer 2 ("CP2") | 5/23/72 | 8,200 |

Results:

The results for high concentrations (i.e., 40 ppm in conventional wash conditions) of the carboxyl group-containing polymers or comparative polymers are provided in Tables 7 and 8. The results for low concentrations (i.e., 10 ppm in conventional wash conditions) of the carboxyl group-containing polymers or comparative polymers are provided in Tables 9 and 10.

The results in Tables 7 and 8 demonstrated that carboxyl group-containing Polymers 1 and 4 demonstrated superior $\Delta W$ whiteness index (i.e., whiteness index) than any of the comparative polymers under high concentrations. When formulating laundry detergents using low concentrations of carboxyl group-containing polymers vs. comparative polymers, the improved whiteness maintenance is even more significant as shown in Tables 9 and 10. The results tend to suggest that carboxyl group-containing polymers are considerably more active, on a molar basis, than the comparative polymers, and therefore carboxyl group-containing polymers might have sufficient activity, particularly in dilute wash conditions to achieve the required cleaning performance, i.e., whiteness maintenance. These results favor the use of the carboxyl group-containing polymers of the present invention in laundry detergents or cleaning compositions over the prior art polymers, and in particular, the carboxyl group-containing polymers from WO '468, for the benefits and/or utilities as described herein in that a higher whiteness maintenance activity may be achieved at lower concentration levels without adversely effecting performance.

Additionally, the impact of molecular weight on whiteness maintenance in reference to Comparative Polymer 1 is shown in FIG. 1. According to FIG. 1, the higher molecular weight carboxyl group-containing polymer showed significantly enhanced whiteness maintenance performance.

TABLE 7

High Concentration (40 ppm): Polyester (PW19); Single cycle Wash

| Polymer or Comparative Polymer | Weight Average Molecular Weight (g/mol) | $\Delta W$ | % WME (CP2) |
|---|---|---|---|
| Comparative Polymer 2 ("CP2") | 8,200 | −26.6 | 0.0 |
| Polymer 15 | 58,000 | −24.8 | 6.77% |
| Polymer 1 | 35,000 | −23.2 | 12.78% |
| Polymer 4 | 39,000 | −22.8 | 14.29% |

TABLE 8

High Concentration (40 ppm): Polyester (PW19); Single cycle Wash

| Polymer or Comparative Polymer | Weight Average Molecular Weight (g/mol) | $\Delta W$ | % WME (CP1) |
|---|---|---|---|
| Comparative Polymer 1 ("CP1") | 17,000 | −27.4 | 0.0 |
| Polymer 1 | 35,000 | −24.3 | 11.31% |

TABLE 9

Low Concentration (10 ppm): Polyester (PW19); Single cycle Wash

| Polymer or Comparative Polymer | Weight Average Molecular Weight (g/mol) | $\Delta W$ | % WME (CP2) |
|---|---|---|---|
| Comparative Polymer 2 ("CP2") | 8,200 | −28.5 | 0% |
| Polymer 1 | 35,000 | −21.7 | 24.21% |
| Polymer 4 | 39,000 | −20.7 | 27.35% |

TABLE 10

Low Concentration (10 ppm): Polyester (PW19); Single Wash

| Polymer or Comparative Polymer | Weight Average Molecular Weight (g/mol) | ΔW | % WME (CP1) |
|---|---|---|---|
| Comparative Polymer 1 ("CP1") | 17,000 | −27.5 | 0% |
| Polymer 1 | 35,000 | −19.6 | 28.73% |

Example 5

Synthesis of the Laundry Detergent Formulations

Sample laundry detergent formulations are prepared using the carboxyl group-containing polymer according to one aspect of the present invention. The formulations are prepared using standard industry practice to mix the ingredients. The formulations are set forth in Table 11. The example laundry detergent formulations are examined to establish their ability to improve anti-soil redeposition and whiteness maintenance from a treated fabric surface during a washing process.

TABLE 11

Sample Laundry Detergent Formulations

| Ingredient | Amount |
|---|---|
| Carboxyl group-containing polymer (comprising from about 0.5% to about 15% by mass of an ether bond-containing monomer (A); from about 0.5% to about 30% by mass of a sulfonic acid group-containing monomer (B); and from about 55% to about 99% by mass of an acrylic acid-based monomer (C); and wherein the average molecular weight is from about 20,000 to about 60,000 preferably in the range of from about 33,000 to about 42,000. In a more preferred embodiment, the carboxyl group-containing polymer is Polymer 1 or Polymer 7 of the present invention, as described herein) | from about 0.5 wt % to about 1.5 wt % |
| Amylase (Stainzyme Plus ®, having an enzyme activity of 14 mg active enzyme/g) | from about 0.1 wt % to about 0.5 wt % |
| Anionic detersive surfactant (such as alkyl benzene sulphonate, alkyl ethoxylated sulphate and mixtures thereof) | from about 8 wt % to about 15 wt % |
| Non-ionic detersive surfactant (such as alkyl ethoxylated alcohol) | from about 0.5 wt % to 4 wt % |
| Cationic detersive surfactant (such as quaternary ammonium compounds) | from about 0 wt % to about 4 wt % |
| Other detersive surfactant (such as zwiterionic detersive surfactants, amphoteric surfactants and mixtures thereof) | from about 0 wt % to 4 wt % |
| Carboxylate polymer (such as co-polymers of maleic acid and acrylic acid) | from about 1 wt % to about 4 wt % |
| Polyethylene glycol polymer (such as a polyethylene glycol polymer comprising poly vinyl acetate side chains) | from about 0 wt % to about 4 wt % |
| Polyester soil release polymer (such as Repel-o-tex and/or Texcare polymers) | from about 0.1 wt % to about 2 wt % |
| Cellulosic polymer (such as carboxymethyl cellulose, methyl cellulose and combinations thereof) | from about 0.5 wt % to about 2 wt % |
| Other polymer (such as amine polymers, dye transfer inhibitor polymers, hexamethylenediamine derivative polymers, and mixtures thereof) | from about 0 wt % to about 4 wt % |
| Zeolite builder and phosphate builder (such as zeolite 4A and/or sodium tripolyphosphate) | from about 0 wt % to about 4 wt % |
| Other builder (such as sodium citrate and/or citric acid) | from about 0 wt % to about 3 wt % |
| Carbonate salt (such as sodium carbonate and/or sodium bicarbonate) | from about 15 wt % to about 30 wt % |
| Silicate salt (such as sodium silicate) | from about 0 wt % to about 10 wt % |
| Filler (such as sodium sulphate and/or bio-fillers) | from about 10 wt % to about 40 wt % |
| Source of available oxygen (such as sodium percarbonate) | from about 10 wt % to about 20 wt % |
| Bleach activator (such as tetraacetylethylene diamine (TAED) and/or nonanoyloxybenzenesulphonate (NOBS) | from about 2 wt % to about 8 wt % |
| Bleach catalyst (such as oxaziridinium-based bleach catalyst and/or transition metal bleach catalyst) | from about 0 wt % to about 0.1 wt % |
| Other bleach (such as reducing bleach and/or pre-formed peracid) | from about 0 wt % to about 10 wt % |
| Chelant (such as ethylenediamine-N'N'-disuccinic acid (EDDS) and/or hydroxyethane diphosphonic acid (HEDP) | from about 0.2 wt % to about 1 wt % |
| Photobleach (such as zinc and/or aluminium sulphonated phthalocyanine) | from about 0 wt % to about 0.1 wt % |

TABLE 11-continued

Sample Laundry Detergent Formulations

| Ingredient | Amount |
| --- | --- |
| Hueing agent (such as direct violet 99, acid red 52, acid blue 80, direct violet 9, solvent violet 13 and any combination thereof) | from about 0 wt % to about 0.5 wt % |
| Brightener (such as brightener 15 and/or brightener 49) | from about 0.1 wt % to about 0.4 wt % |
| Protease (such as Savinase, Polarzyme, Purafect, FN3, FN4 and any combination thereof, typically having an enzyme activity of from about 20 mg to about 100 mg active enzyme/g) | from about 0.1 wt % to about 1.5 wt % |
| Amylase (such as Termamyl ®, Termamyl Ultra ®, Natalase ®, Optisize HT Plus ®, Powerase ®, Stainzyme ® and any combination thereof, typically having an enzyme activity of from about 10 mg to about 50 mg active enzyme/g) | from about 0.05 wt % to about 0.2 wt % |
| Cellulase (such as Carezyme ®, Celluzyme ® and/or Celluclean ®, typically having an enzyme activity of from 10 to 50 mg active enzyme/g) | from about 0.05 wt % to about 0.5 wt % |
| Lipase (such as Lipex ®, Lipolex ®, Lipoclean ® and any combination thereof, typically having an enzyme activity of from about 10 mg to about 50 mg active enzyme/g) | from about 0.2 wt % to about 1 wt % |
| Other enzyme (such as xyloglucanase (e.g., Whitezyme ®), cutinase, pectate lyase, mannanase, bleaching enzyme, typically having an enzyme activity of from about 10 mg to about 50 mg active enzyme/g) | from 0 wt % to 2 wt % |
| Fabric softener (such as montmorillonite clay and/or polydimethylsiloxane (PDMS)) | from 0 wt % to 15 wt % |
| Flocculant (such as polyethylene oxide) | from 0 wt % to 1 wt % |
| Suds suppressor (such as silicone and/or fatty acid) | from 0 wt % to 0.1 wt % |
| Perfume (such as perfume microcapsule, spray-on perfume, starch encapsulated perfume accords, perfume loaded zeolite, and any combination thereof) | from 0.1 wt % to 1 wt % |
| Aesthetics (such as colored soap rings and/or colored speckles/noodles) | from 0 wt % to 1 wt % |
| Miscellaneous | Balance |

*All enzyme levels expressed as rug active enzyme protein per 100 g detergent composition.

Surfactant ingredients can be obtained from BASF, Ludwigshafen, Germany (Lutensol®); Shell Chemicals, London, UK; Stepan, Northfield, Ill., USA; Huntsman, Huntsman, Salt Lake City, Utah, USA; Clariant, Sulzbach, Germany (Praepagen®).

Sodium tripolyphosphate can be obtained from Rhodia, Paris, France.

Zeolite can be obtained from Industrial Zeolite (UK) Ltd, Grays, Essex, UK.

Citric acid and sodium citrate can be obtained from Jungbunzlauer, Basel, Switzerland.

NOBS is sodium nonanoyloxybenzenesulfonate, supplied by Eastman, Batesville, Ark., USA.

TAED is tetraacetylethylenediamine, supplied under the Peractive® brand name by Clariant GmbH, Sulzbach, Germany.

Sodium carbonate and sodium bicarbonate can be obtained from Solvay, Brussels, Belgium.

Polyacrylate, polyacrylate/maleate copolymers can be obtained from BASF, Ludwigshafen, Germany.

Repel-O-Tex® can be obtained from Rhodia, Paris, France.

Texcare® can be obtained from Clariant, Sulzbach, Germany.

Sodium percarbonate and sodium carbonate can be obtained from Solvay, Houston, Tex., USA.

Na salt of Ethylenediamine-N,N'-disuccinic acid, (S,S) isomer (EDDS) was supplied by Octel, Ellesmere Port, UK.

Hydroxyethane di phosphonate (HEDP) was supplied by Dow Chemical, Midland, Mich., USA.

Enzymes Savinase®, Savinase® Ultra, Stainzyme® Plus, Lipex®, Lipolex®, Lipoclean®, Celluclean®, Carezyme®, Natalase®, Stainzyme®, Stainzyme® Plus, Termamyl®, Termamyl® ultra, and Mannaway® can be obtained from Novozymes, Bagsvaerd, Denmark.

Enzymes Purafect®, FN3, FN4 and Optisize can be obtained from Genencor International Inc., Palo Alto, Calif., US.

Direct violet 9 and 99 can be obtained from BASF DE, Ludwigshafen, Germany.

Solvent violet 13 can be obtained from Ningbo Lixing Chemical Co., Ltd. Ningbo, Zhejiang, China.

Brighteners can be obtained from Ciba Specialty Chemicals, Basel, Switzerland.

All percentages and ratios are calculated by weight unless otherwise indicated. All percentages and ratios are calculated based on the total composition unless otherwise indicated. It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laundry detergent or cleaning composition comprising a carboxyl group-containing polymer comprising:

i. a structure unit (a) derived from an ether bond-containing monomer (A); wherein the structure unit (a) is represented by the formula (1):

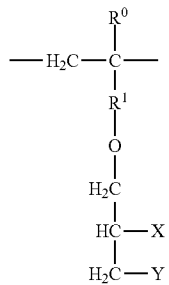

(1)

wherein $R^0$ represents a hydrogen atom or a methyl group; $R^1$ represents a $CH_2$ group, a $CH_2CH_2$ group, or a direct bond; X represents a hydroxyl group or a group represented by the formula (2) or (3):

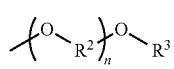

(2)

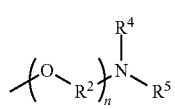

(3)

wherein $R^2$s, which may be the same or different, represent a $C_2$-$C_4$ alkylene group; n represents an average addition number of moles of an oxyalkylene group (—O—$R^2$—) and is 0 to 5; and $R^3$, $R^4$ and $R^5$ independently represent a $C_1$-$C_4$ alkyl group;

Y represents a hydroxyl group or a group represented by the formula (2) or (3); and one of X and Y is a hydroxyl group and the other is a group represented by the formula (2) or (3), ii. a structure unit (b) derived from a sulfonic acid group-containing monomer (B); and ii. a structure unit (c) derived from an acrylic acid-based monomer (C); and an oxaziridinium-based bleach catalyst having the formula (IX):

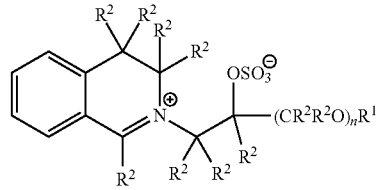

(IX)

wherein: $R^1$ is selected from the group consisting of H, a branched alkyl group containing from 3 to 24 carbons, and a linear alkyl group containing from 1 to 24 carbons; $R^2$ is independently selected from the group consisting of H, a branched alkyl group comprising from 3 to 12 carbons, and a linear alkyl group comprising from 1 to 12 carbons; and n is an integer from 0 to 1, wherein:

the structure unit (a) is present at a level of from about 0.5% to about 15% by mass based on 100% by mass of all structure units derived from all monomers in the carboxyl group-containing polymer;

the structure unit (b) is present at a level of from about 0.5% to about 30% by mass based on 100% by mass of all the structure units derived from all the monomers in the carboxyl group-containing polymer; and the structure unit (c) is present at a level of from about 55% to about 99% by mass based on 100% by mass of all the structure units derived from all the monomers in the carboxyl group-containing polymer;

and the carboxyl group-containing polymer has a weight average molecular weight of from about 20,000 to about 60,000.

2. The laundry detergent or cleaning composition according to claim 1, and an adduct of a hydrogen sulfite to the acrylic acid-based monomer (C), wherein the adduct is present at a level of from about 0.01% to about 1.5% by mass based on 100% by mass of a solids content of the carboxyl group-containing polymer composition.

3. The laundry detergent or cleaning composition according to claim 1, wherein the laundry detergent or cleaning composition is selected from the group consisting of a liquid laundry detergent composition, a solid laundry detergent composition, a hard surface cleaning composition, a liquid hand dishwashing composition, a solid automatic dishwashing composition, a liquid automatic dishwashing composition, and a tab/unit dose form automatic dishwashing composition.

4. The laundry detergent or cleaning composition according to claim 1, wherein the carboxyl group-containing polymer comprises:

(1) the structure unit (a) from about 1% to about 9%, by mass;

(2) the structure unit (b) from about 1% to about 23%, by mass; and (3) the structure unit (c) from about 68% to about 98%, by mass.

5. The laundry detergent or cleaning compositions according to claim 1, wherein the carboxyl group-containing polymer has a weight average molecular weight of from about 30,000 to 50,000.

6. The laundry detergent or cleaning composition according to claim 1, wherein the carboxyl group-containing polymer is selected from the group consisting of:

| Polymer | Struct. Unit (a) Mass % | Struct. Unit (b) Mass % | Struct. Unit (c) Mass % | Weight Average Molecular Weight (g/mol) |
|---|---|---|---|---|
| 1 | 5% | 23% | 72% | 35,000 |
| 2 | 15% | 13% | 72% | 37,000 |
| 3 | 10% | 18% | 72% | 46,000 |
| 4 | 5% | 15% | 80% | 35,000 |
| 5 | 5% | 5% | 90% | 37,000 |
| 6 | 5% | 15% | 80% | 47,000 |
| 7 | 5% | 15% | 80% | 39,000 |
| 8 | 5% | 15% | 80% | 32,000 |
| 9 | 5% | 15% | 80% | 25,000 |
| 10 | 8% | 8% | 84% | 46,000 |
| 11 | 5% | 23% | 72% | 43,000 |
| 12 | 9% | 12% | 79% | 22,000 |
| 13 | 3% | 17% | 80% | 34,000 |
| 14 | 5% | 23% | 72% | 28,000 |
| 15 | 5% | 23% | 72% | 58,000 |

7. The laundry detergent or cleaning composition according to claim 1, wherein the carboxyl group-containing polymer comprises:

i. the structure unit (a) as represented by the formula (1) wherein $R^0$ is a hydrogen atom; $R^1$ is a $CH_2$ group; X is a hydroxyl group; and Y is formula (2); and formula (2) wherein n is 0; and $R^3$ is a $C_1$-$C_4$ alkyl group;

ii. the structure unit (b) as represented by the formula (5):

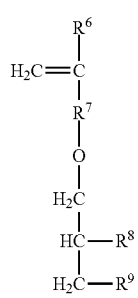

(5)

wherein $R^6$ represents a hydrogen atom or a methyl group; $R^7$ represents a $CH_2$ group, a $CH_2CH_2$ group, or a direct bond; $R^8$ and $R^9$ independently represent a hydroxyl group or —$SO_3Z$; Z represents a hydrogen atom, a metal atom, an ammonium group, or an organic amine group; and at least one of $R^8$ and $R^9$ is —$SO_3Z$; and iii. the structure unit (c) as represented by formula (8):

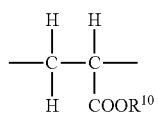

(8)

wherein $R^{10}$ represents a hydrogen atom, a metal atom, an ammonium group, or an organic amine group.

8. The laundry detergent or cleaning composition according to claim 7, wherein the structure unit (b) is selected from the group consisting of vinylsulfonic acid, styrenesulfonic acid, (meth)allylsulfonic acid, 3-(meth)allyloxy-2-hydroxypropanesulfonic acid, 3-(meth)allyloxy-1-hydroxypropanesulfonic acid, 2-(meth)allyloxyethylenesulfonic acid, or 2-acrylamide-2-methylpropanesulfonic acid.

9. The laundry detergent or cleaning composition according to claim 1, wherein the carboxyl group-containing polymer has an anti-soil redeposition ratio of from about 37.0% to about 46.0%, according to the Anti-Soil Redeposition Test as described herein.

10. The laundry detergent or cleaning composition according to claim 1, wherein the carboxyl group-containing polymer has a whiteness index measurement of from about 2.0 or greater, according to the Whiteness Maintenance Assay as described herein.

11. The laundry detergent or cleaning composition according to claim 1, wherein the carboxyl group-containing polymer has a % Whiteness Maintenance Effect (WME) of at least 6%.

12. The laundry detergent or cleaning composition according to claim 9, wherein a wash solution comprises the carboxyl group-containing polymer at a concentration of less than about 40 ppm.

13. The laundry detergent or cleaning composition according to claim 1, wherein the laundry detergent or cleaning composition comprises a detersive surfactant, wherein the detersive surfactant comprises:

(i) alkyl alkoxylated sulphate anionic detersive surfactant having an average degree of alkoxylation of from 0.5 to 5; and/or (ii) predominantly $C_{12}$ alkyl sulphate anionic detersive surfactant; and/or (iii) less than 25% non-ionic detersive surfactant.

14. The laundry detergent or cleaning composition according to claim 1, wherein the laundry detergent or cleaning composition comprises a clay and a soil removal/anti-redeposition agent selected from the group consisting of:

(a) random graft co-polymers comprising:
(i) hydrophilic backbone comprising polyethylene glycol; and
(ii) hydrophobic side chain(s) selected from the group consisting of: $C_4$-$C_{25}$ alkyl group, polypropylene, polybutylene, vinyl ester of a saturated $C_1$-$C_6$ monocarboxylic acid, $C_1$-$C_6$ alkyl ester of acrylic or methacrylic acid, and mixtures thereof;

(b) cellulosic polymers having a degree of substitution (DS) of from 0.01 to 0.99 and a degree of blockiness (DB) such that either DS+DB is at least 1.00 or DB+2DS−$DS^2$ is at least 1.20;

(c) co-polymers comprising:
(i) from 50 to less than 98 wt % structural units derived from one or more monomers comprising carboxyl groups;

(ii) from 1 to less than 49 wt % structural units derived from one or more monomers comprising sulfonate moieties; and
(iii) from 1 to 49 wt % structural units derived from one or more types of monomers selected from ether bond-containing monomers represented by formulas (VI) and (VII):

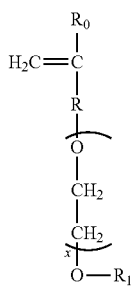  (VI)

wherein in formula (VI), $R_0$ represents a hydrogen atom or $CH_3$ group, R represents a $CH_2$ group, $CH_2CH_2$ group or single bond, X represents a number 0-5 provided X represents a number 1-5 when R is a single bond, and $R_1$ is a hydrogen atom or $C_1$ to $C_{20}$ organic group;

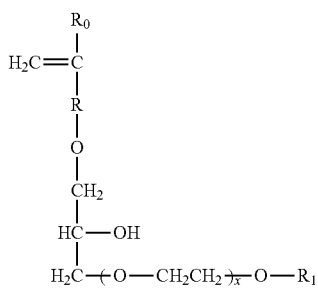  (VII)

in formula (VII), $R_o$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group;
(d) polyester soil release polymers having a structure according to one of the following structures (III), (IV) or (V):

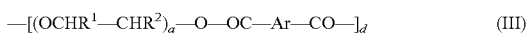  (III)

  (IV)

  (V)

wherein:
a, b and c are from 1 to 200;
d, e and f are from 1 to 50;
Ar is a 1,4-substituted phenylene;
sAr is 1,3-substituted phenylene substituted in position 5 with $SO_3$Me;
Me is Li, K, Mg/2, Ca/2, Al/3, ammonium, mono-, di-, tri-, or tetra-alkylammonium wherein the alkyl groups are $C_1$-$C_{18}$ alkyl or $C_2$-$C_{10}$ hydroxyalkyl, or any mixture thereof;
$R^1$, $R^2$, $R^3$, $R^4$, $R^5$ and $R^6$ are independently selected from H or $C_1$-$C_{18}$ n- or iso-alkyl; and $R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group; and
(e) any combination thereof.

15. The laundry detergent or cleaning composition according to claim 1, wherein the laundry detergent or cleaning composition is substantially free of zeolite builder, and wherein the composition is substantially free of phosphate builder.

16. The laundry detergent or cleaning composition according to claim 1, wherein the laundry detergent or cleaning composition further comprises adjunct selected from the group consisting of, enzymes, alkali builders, chelant builders, bleaches, bleaching assisting agents, perfumes, defoaming agents, bactericides, corrosion inhibitors, and mixtures thereof.

17. A cleaning implement comprising a nonwoven substrate and the laundry detergent or cleaning composition according to claim 1.

18. A laundry detergent or cleaning composition comprising a carboxyl group-containing polymer comprising:
i. a structure unit (a) derived from an ether bond-containing monomer (A); wherein the structure unit (a) is represented by the formula (1):

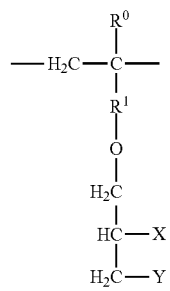  (1)

wherein $R^0$ represents a hydrogen atom or a methyl group; $R^1$ represents a $CH_2$ group, a $CH_2CH_2$ group, or a direct bond; X represents a hydroxyl group or a group represented by the formula (2) or (3):

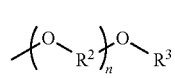  (2)

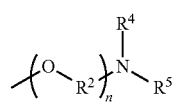  (3)

wherein $R^2$s, which may be the same or different, represent a $C_2$-$C_4$ alkylene group; n represents an average addition number of moles of an oxyalkylene group ($—O—R^2—$) and is 0 to 5; and $R^3$, $R^4$ and $R^5$ independently represent a $C_1$-$C_4$ alkyl group;
Y represents a hydroxyl group or a group represented by the formula (2) or (3); and one of X and Y is a hydroxyl group and the other is a group represented by the formula (2) or (3),
ii. a structure unit (b) derived from a sulfonic acid group-containing monomer (B); and
iii. a structure unit (c) derived from an acrylic acid-based monomer (C); and a C.I. fluorescent brightener 260 having the following structure (X):

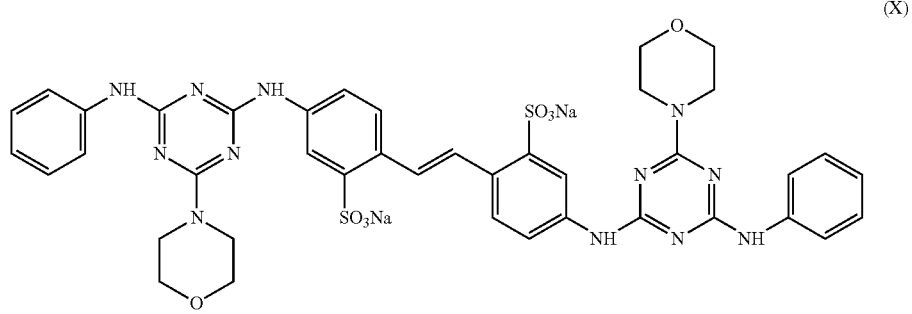

wherein the C.I. fluorescent brightener 260 is either:
predominantly in alpha-crystalline form; or
predominantly in beta-crystalline form and has a weight average primary particle size of from 3 to 30 micrometers, wherein:
the structure unit (a) is present at a level of from about 0.5% to about 15% by mass based on 100% by mass of all structure units derived from all monomers in the carboxyl group-containing polymer;
the structure unit (b) is present at a level of from about 0.5% to about 30% by mass based on 100% by mass of all the structure units derived from all the monomers in the carboxyl group-containing polymer; and
the structure unit (c) is present at a level of from about 55% to about 99% by mass based on 100% by mass of all the structure units derived from all the monomers in the carboxyl group-containing polymer;
and the carboxyl group-containing polymer has a weight average molecular weight of from about 20,000 to about 60,000.

19. A laundry detergent or cleaning composition comprising a carboxyl group-containing polymer comprising:
  i. a structure unit (a) derived from an ether bond-containing monomer (A); wherein the structure unit (a) is represented by the formula (1):

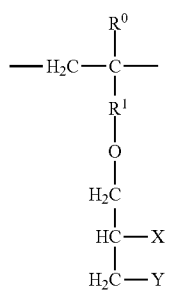

wherein $R^0$ represents a hydrogen atom or a methyl group; $R^1$ represents a $CH_2$ group, a $CH_2CH_2$ group, or a direct bond; X represents a hydroxyl group or a group represented by the formula (2) or (3):

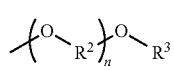

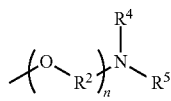

wherein $R^2$s, which may be the same or different, represent a $C_2$-$C_4$ alkylene group; n represents an average addition number of moles of an oxyalkylene group (—O—$R^2$—) and is 0 to 5; and $R^3$, $R^4$ and $R^5$ independently represent a $C_1$-$C_4$ alkyl group;
Y represents a hydroxyl group or a group represented by the formula (2) or (3); and one of X and Y is a hydroxyl group and the other is a group represented by the formula (2) or (3),
  ii. a structure unit (b) derived from a sulfonic acid group-containing monomer (B); and
  iii. a structure unit (c) derived from an acrylic acid-based monomer (C); and
  an enzyme selected from the group consisting of
    (a) a variant of *thermomyces lanuginosa* lipase having >90% identity with the wild type amino acid and comprises substitution(s) at T231 and/or N233;
    (b) a cleaning cellulase belonging to Glycosyl Hydrolase family 45;
    (c) a variant of AA560 alpha amylase endogenous to *Bacillus* sp. DSM 12649 having:
      (i) mutations at one or more of positions 9, 26, 149, 182, 186, 202, 257, 295, 299, 323, 339 and 345; and
      (ii) one or more substitutions and/or deletions in the following positions: 118, 183, 184, 195, 320 and 458; and
    (d) any combination thereof,
wherein:
the structure unit (a) is present at a level of from about 0.5% to about 15% by mass based on 100% by mass of all structure units derived from all monomers in the carboxyl group-containing polymer;
the structure unit (b) is present at a level of from about 0.5% to about 30% by mass based on 100% by mass of all the structure units derived from all the monomers in the carboxyl group-containing polymer; and
the structure unit (c) is present at a level of from about 55% to about 99% by mass based on 100% by mass of all the structure units derived from all the monomers in the carboxyl group-containing polymer;
and the carboxyl group-containing polymer has a weight average molecular weight of from about 20,000 to about 60,000.

* * * * *